United States Patent [19]

Matsumura et al.

[11] Patent Number: 5,155,513
[45] Date of Patent: Oct. 13, 1992

[54] DATA IMPRINTING DEVICE FOR CAMERA

[75] Inventors: Koichi Matsumura; Yasushi Shiotani, both of Kanagawa, Japan

[73] Assignee: Canon Kabushiki Kaisha, Tokyo, Japan

[21] Appl. No.: 738,955

[22] Filed: Aug. 1, 1991

Related U.S. Application Data

[63] Continuation of Ser. No. 430,782, Nov. 2, 1989, abandoned.

[30] Foreign Application Priority Data

Nov. 8, 1988 [JP] Japan ............................. 63-281996
Nov. 8, 1988 [JP] Japan ............................. 63-281997
Nov. 8, 1988 [JP] Japan ............................. 63-281998

[51] Int. Cl.$^5$ ............................................. G03B 17/24
[52] U.S. Cl. .................................................... 354/106
[58] Field of Search ......................................... 354/106

[56] References Cited

U.S. PATENT DOCUMENTS 4,751,546 6/1988 Yamamoto et al. ............ 354/106 X
4,825,233 4/1989 Kanai et al. ........................ 354/106
4,860,039 8/1989 Hata et al. .......................... 354/106

Primary Examiner—Michael L. Gellner
Attorney, Agent, or Firm—Robin, Blecker, Daley & Driscoll

[57] ABSTRACT

The present patent application discloses a data imprinting device for camera provided with a memory for previously storing a plurality of messages, an imprinting member receptive of a message stored in the memory for imprinting it on a photographic material, and a selection circuit for selecting one of the plurality of messages to be imprinted by the imprinting member.

48 Claims, 16 Drawing Sheets

FIG.8
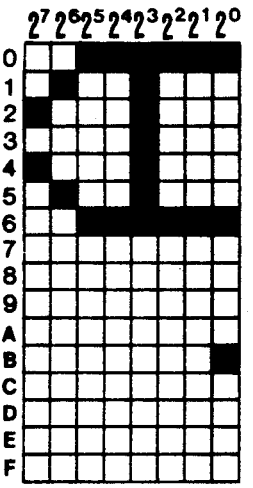
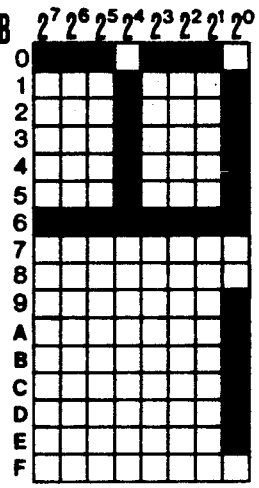
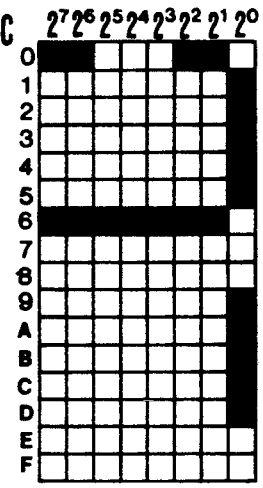
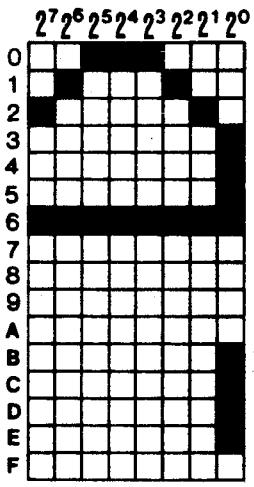
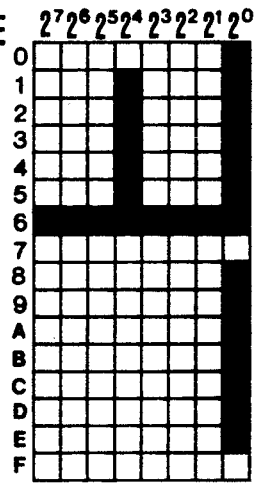
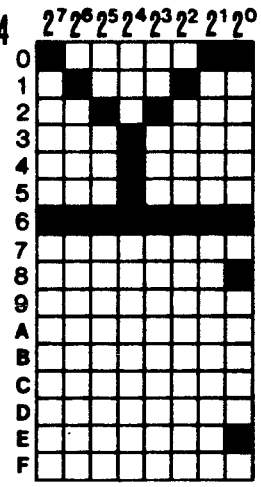
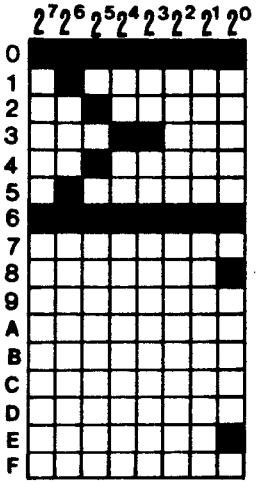
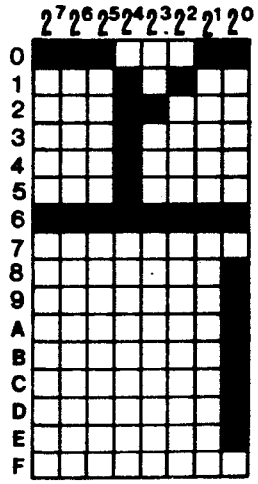
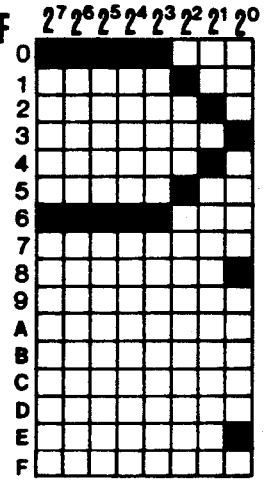

FIG. 10

CORRESPONDENCE BETWEEN MESSAGE MODES AND STORED DATA

| VALUE OF COUNTER | 0 STORED DATA | 0 FONT | 1 STORED DATA | 1 FONT | 2 STORED DATA | 2 FONT | 3 STORED DATA | 3 FONT | 4 STORED DATA | 4 FONT |
|---|---|---|---|---|---|---|---|---|---|---|
| PD ON 0M / 0H | YERL 7 | yL | YERL 7 | yL | A 9 | ! | A 9 | ! | A 9 | ! |
| 1M / 1H | YERH 7 | yH | YERH 7 | yH | C 8 | S | E 8 | U | E 8 | U |
| 2M / 2H | 6 9 | . | 6 9 | . | 7 8 | N | 8 8 | O | 8 8 | O |
| 3M / 3H | 2 9 | Y | C 8 | S | 8 8 | O | 2 9 | Y | 2 9 | Y |
| 4M / 4H | A 7 | A | A 7 | A | 2 8 | I | 5 9 | BLK | 5 9 | BLK |
| 5M / 5H | D 7 | D | 6 8 | M | D 8 | T | E 7 | E | 4 8 | K |
| 6M / 6H | 1 8 | H | D 8 | T | A 7 | A | F 8 | V | 7 8 | N |
| 7M / 7H | D 8 | T | C 8 | S | 5 8 | L | 8 8 | O | A 7 | A |
| 8M / 8H | B 8 | R | 2 8 | I | E 8 | U | 5 8 | L | 1 8 | H |
| 9M / 9H | 2 8 | I | B 8 | R | D 8 | T | 5 9 | BLK | D 8 | T |
| 10M / 10H | B 7 | B | 1 8 | H | A 7 | A | 2 8 | I | 5 9 | BLK |
| 11M / 11H | 5 9 | BLK | C 7 | C | B 8 | R | 5 9 | BLK | 5 9 | BLK |
| 12M / 12H | 2 9 | Y | 5 9 | BLK | 0 8 | G | 5 9 | BLK | 5 9 | BLK |
| 13M / 13H | 9 8 | P | 2 9 | Y | 7 8 | N | 5 9 | BLK | 5 9 | BLK |
| 14M / 14H | 9 8 | P | B 8 | R | 8 8 | O | 5 9 | BLK | 5 9 | BLK |
| 15M / 15H | A 7 | A | B 8 | R | C 7 | C | 5 9 | BLK | 5 9 | BLK |
| 16M / 16H | 1 8 | H | E 7 | E | 5 9 | BLK | 5 9 | BLK | 5 9 | BLK |
| 17M / 17H | 5 9 | BLK | 6 8 | M | 5 9 | BLK | 5 9 | BLK | 5 9 | BLK |

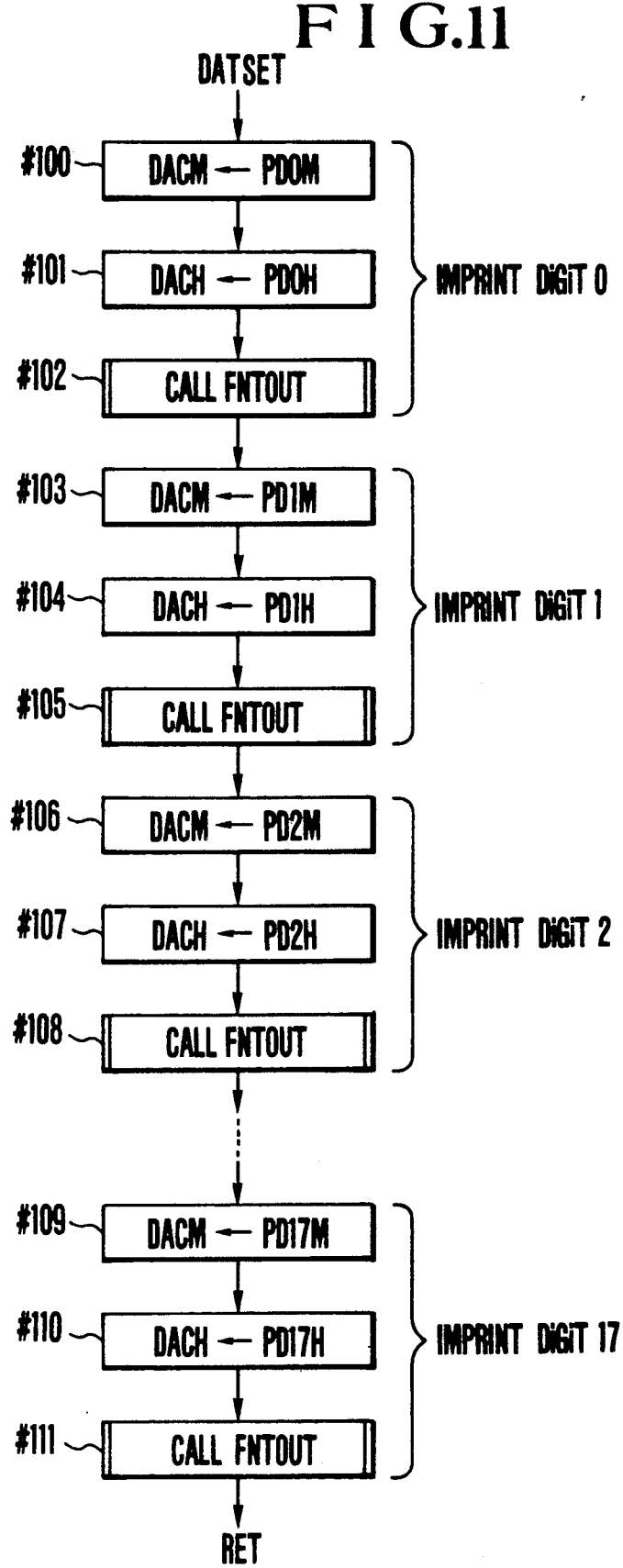

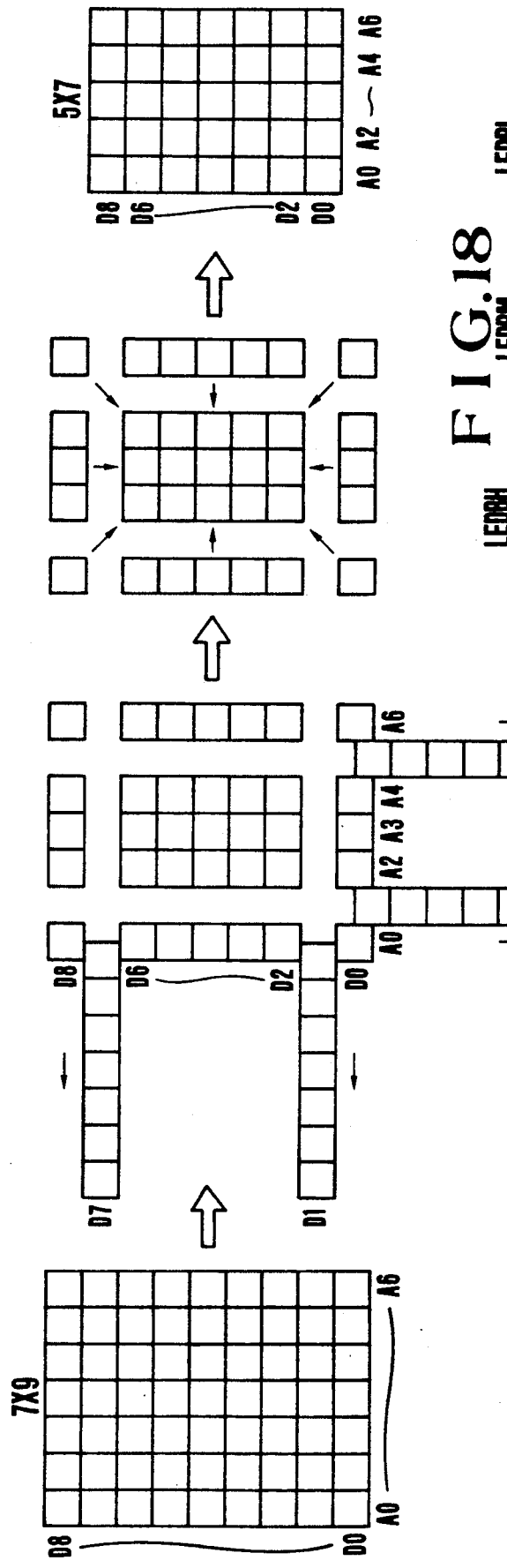

DATA IMPRINTING DEVICE FOR CAMERA

This is a continuation application under 37 CFR 1.62 of prior application Ser. No. 430,782, filed Nov. 2, 1989, now abandoned.

BACKGROUND OF THE INVENTION

1. Field of the Invention

This invention relates to a data imprinting device for a camera capable, upon need of imprinting a message serving as a caption (for example, a short comment phrase such as "HAPPY BIRTHDAY", etc.) on film.

2. Description of the Related Art

It is known to provide the camera, particularly a so-called "high-priced" a camera, with a device for imprinting a desired message in the photographed frame of film by operating a key board or like input means so that the letters of the message are read character by character from a data bank. With this device in use, if the user properly uses the key board at the time of shooting, it becomes possible that when the photograph is later printed, a compensating image the mood and feeling of a scene is provided in the form of a message sentence, or that a photograph of high value is obtained. It is to be noted that based on a similar concept to this, a variety of imprinting devices which make it possible to imprint so-called "date" information on the film also been proposed.

An alphanumeric imprinting device as described above, due to its ability to imprint letters input from the key board, provides wide versatility without limiting the text of a comment, etc. to be imprinted. However, on the other hand, the user's freedom of taking shots is hampered because manual inputting of the comment, etc., is a very troublesome and time consuming operation. Hence, a problem arises in that the frequency of use of the alphanumeric printing by the user is low.

As has also been described above, system which imprints date information is widely used in recently developed cameras. With this system and particularly one having the capability of automatically counting the date (or the date renewal capability), although from the use of frequency viewpoint, there is merit in that the troublesome operation is obviated, the use of date information alone in the photograph leads to a large difference of its value from the mood and feeling information such as the message.

SUMMARY OF THE INVENTION

With the above-described problems of the conventional types of imprinting devices for cameras in mind, an object of the present invention is to provide a data imprinting device for a camera in which, on the assumption that a large proportion of the events which the user of this kind of camera plans to capture fall into a few different categories (for example, pictures are often taken when celebrating a birthday) previously determined certain messages (for example, the phrase "HAPPY BIRTHDAY") are stored in a memory which belongs to an electronic control device or the like of the camera, and are selectively designated by a manual switch or the like, thus making it possible that a simple operation suffices for imprinting the necessary comment and others on a photosensitive means such as a photographic film.

To achieve the above-described object, the present invention provides a data imprinting device for a camera including memory means for storing a plurality of messages, imprinting means for imprinting, on photosensitive means a message stored in the memory means, and selection means for selecting a message to be imprinted by the imprinting means from among the plurality of messages.

Another object of the invention is to introduce into the data imprinting device of the character described above a capability that, depending on the sort of message, for those messages which are suited to have information of date in full scale imprinted alongside, all the data on the date, i.e., "year, month and day", are imprinted at the same time, and for other ones such as "X'MAS" which have the invariable month and day, the data only in year is imprinted at the same time, thus satisfying a higher demand of the user.

It should be noted in connection with the above-described arrangement that the reason that the date to be imprinted at the same time with the message. which date is invariable in month and day, is limited to year information is that, for example, in "X'MAS" or like message phrase, imprinting of the date only in year will be sufficient, so that the addition of the other data even in month and day when imprinted, because of not only the rapid increase in the number of letters used but also the redundant recitation, would rather result in disadvantages in that the message effect which is produced with no less effort is thinned, and that the captured event in the photograph becomes unpleasant to see.

Yet another object of the invention is to provide the data imprinting device of the character described above with means being used by taking into account the drawback that as the photographer intends to put a message into, for example, only one frame, the photographer, after this frame has been exposed, must cancel the message imprinting mode, otherwise, the subsequent frames would be imprinted always with the first selected message so that all or some of the pictures taken in these frames as depending on the nature of their events become nonsense, thus making an irretrievable error, whereby the capability of easily and quickly setting the messages to be imprinted not only is introduced, but also, on the assumption that this leads to a possibility of occurrence of forgetting to cancel the message mode, provision is made for preventing propagation of the imprinting for undesired frames.

To achieve the above-described object, the present invention provides a data imprinting device of the character described above with means for canceling the aforesaid mode of imprinting the messages in response to one shot, exchange of the film, turning on or off of the electric power source, etc.

Still another object of the invention is to provide a data imprinting device for a camera which can cope even with a demand of introducing a capability of imprinting a common message on a plurality of successive frames by using means for hindering the aforesaid canceling means from being rendered operative.

Other objects of the invention will become apparent from the following description of embodiments thereof.

BRIEF DESCRIPTION OF THE DRAWINGS

FIG. 1 to FIG. 13 illustrate a first embodiment of the invention.

FIG. 1 is an electric circuit diagram of the entirety of a device embodying the invention.

FIG. 2 is a perspective view illustrating an operating mechanism for imprinting data on the film by a dot matrix.

FIG. 3 is a top plan view of the details of a liquid crystal display and its deposition in the upper panel of the camera housing.

FIG. 4 is a timing chart for the imprinting operation.

FIG. 6 is a diagram to explain the shifting of the font data.

FIG. 7 is a diagram to explain the process for producing a (7×5) font from the (9×7) font.

FIG. 8 illustrates the description states of a font data table in the ROM.

FIG. 9 and FIGS. 11 to FIG. 13 are flowcharts for the sequence of operations of the first embodiment of the invention.

FIG. 10 is a table illustrating the correspondence of a plurality of message modes with the stored data.

FIG. 17 is similar to FIG. 7 except that instead of the rows $D_2$ and $D_6$, the rows $D_1$ and $D_7$ are pulled out when the compression is performed.

FIG. 18 and FIG. 19 illustrate a fifth embodiment of the invention.

DETAILED DESCRIPTION OF THE PREFERRED EMBODIMENTS

A first embodiment of the invention is described by reference to FIG. 1 to FIG. 13.

Figure 1:
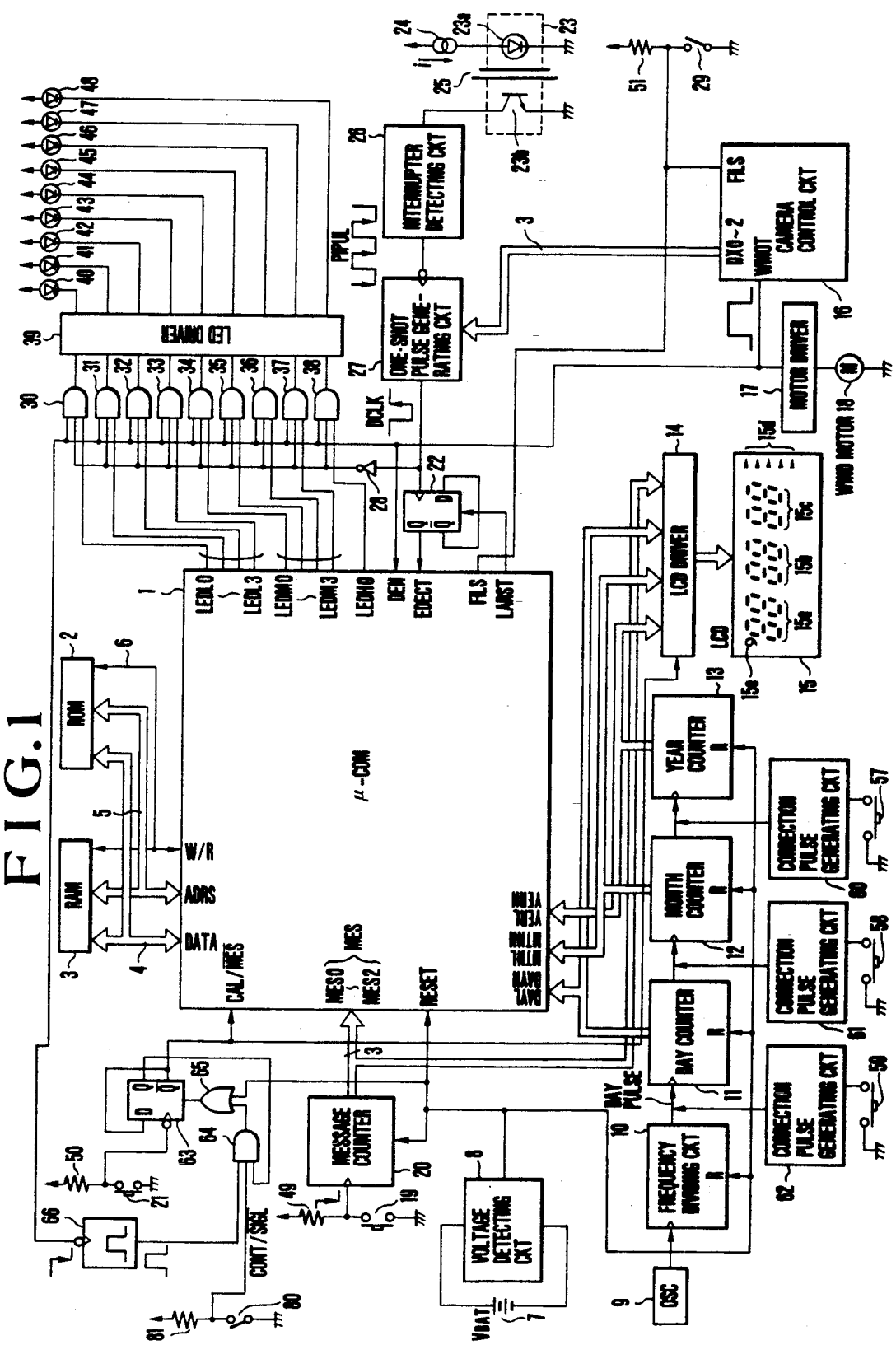

In FIG. 1, a microcomputer ($\mu$-COM) 1 for controlling the sequence of operations communicates with a ROM 2 for storing programs and letter font patterns and a RAM 3 for storing data through a data bus 4, an address bus 5 and a control signal bus 6. A battery 7 supplies current to electrical systems. The voltage of the battery 7 is detected by a voltage detecting circuit 8 to produce a reset pulse when the battery is turned on or when the battery voltage falls below a predetermined level. An oscillation circuit (OSC) 9 produces a train of pulses which are used both to synchronize the systems and as the standard for a watch and a calendar. A frequency dividing circuit 10 receptive of the output of the oscillation circuit 9 produces one pulse for each day. A day counter 11, a month counter 12 and a year counter 13 are connected to each other at their carry-in and carry-out terminals, and arranged to function as an automatic calendar together with a end-of-month correction circuit (not shown).

The outputs of these counters 11 to 13 in the form of BCD×2-digit counter signals are applied to the microcomputer 1 at the respective ports (DAYL, DAYH, MTHL, MTHH, YERL, YERH) and also to a LCD driver 14. Here, L and H represent respectively the place of units of one and the place of units of ten.

An LCD display portion 15 is positioned in the upper panel of the camera to allow confirmation of a date to be imprinted and the selected one of the messages. As shown in enlarged scale in FIG. 3, it is constructed from date display areas (15a, 15b, 15c, 15e) and a message list portion 15d.

A camera control circuit 16 is actuated by pushing a shutter release button (not shown) and controls a sequence of AE, AF, shutter and film winding operations and a series of rewinding and other camera operations in manners known to those skilled in the art. After the termination of the exposure, the camera control circuit 16 commands a driver 17 for a wind motor 18 to wind up the exposed frame of film. A message selection switch 19 changes the content of the message to be imprinted. A quinary message counter 20 counts modes of messages and is constructed so that it counts up each time the message selection switch 19 is pushed. This counted value as a 3-bit binary data is applied to an input port MES of the microcomputer 1. The counted value is simultaneously input even to the LCD driver 14 for the LCD 15 to display what message is selected.

A mode selection switch 21 changes the data to be imprinted over between the calendar and the message. Its output is connected to an input port (CAL) of the microcomputer 1 and the LCD driver 14.

A D-flip-flop (hereinafter abbreviated to D-F/F) 22 monitors the input of imprinting clocks. A photo-interrupter 23 for detecting a film transportation pulse to be described later is constructed with an LED 23a and a phototransistor 23b.

Reference numeral 24 denotes a driver for the LED 23a. A rotary disc 25 produces pulses as the film is transported. The output of the photo-interrupter 23 in the form of an AC signal is converted into a logic signal by a photo-interrupter pulse detecting circuit 26. Responsive to the falling edge of a pulse input from the pulse detecting circuit 26, a pulse generating circuit 27 produces a one shot pulse of certain duration. This duration is determined by information representing the sensitivity of the used film in, for example, 3-bit form supplied from the camera control circuit 16.

Reference numeral 28 denotes an inverter. Nine 3-input AND gates 30 to 38 have their outputs connected to the respective inputs of an 8-channel LED driver 39 for imprinting with dot LEDs 40 to 48. Reference numerals 49 to 51 denote pull-up resistors for the respective switches. Correction switches 57 to 59 are in correspondence to the places of the calendar. Responsive to the outputs of these switches, correction pulse generating circuits 60 to 62 produce correction pulses which are applied to the respective counters 13 to 11 respectively.

Figure 2:
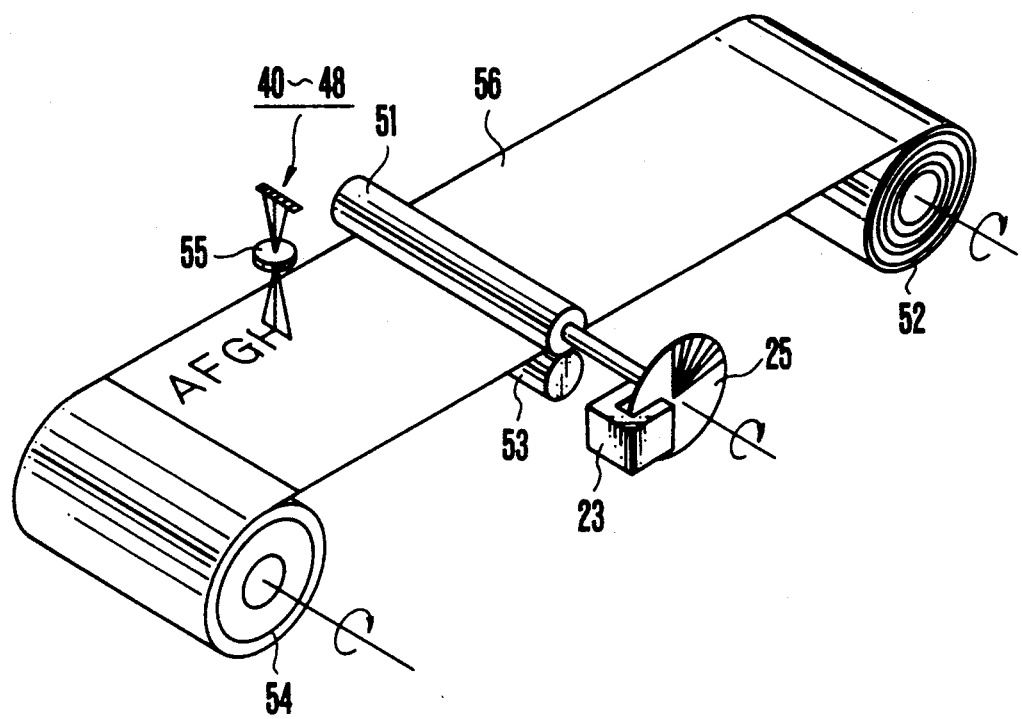

FIG. 2 schematically shows the dot scan imprinting method, where the same constituent parts as those shown in FIG. 1 are denoted by the same numerals. The aforesaid nine LEDs 40 to 48 are arrayed in a row. A pair of rollers 51 and 53 rotate at the same time that the film 56 is transported between a film take-up spool 52 and a film cartridge 54. A projection lens 55 forms images of the LEDs 40 to 48 on the film 56. The rotary disc 25 is mounted on the roller 51 in unified form and cooperates with a photocoupler 23 of the transmission type to produce pulses.

Returning to FIG. 1, a D-F/F 63 inverts its output each time the mode selection switch 21 is pushed. Its $\overline{Q}$ output is connected to an input port iPCAL (in the drawing, labeled CAL) of the microcomputer 1, controlling the selection of the imprinting modes.

Reference numeral 64 denotes an AND gate. Reference numeral 65 denotes an OR gate. A one-shot pulse generating circuit 66 responsive to the falling edge of a control signal for the windup motor 18 of the camera produces a one shot pulse of certain duration.

It should be pointed out in connection with the present embodiment that the AND gate 64 is of the 3-input type whose inputs are connected to the output Q of the aforesaid mode selection switch 21, the output of the aforesaid one-shot pulse generating circuit 66 and the output of a cancel switch 80 for canceling the automatic return from one mode to another. With this, in the normal state (when the cancel switch 80 is off as shown in FIG. 1), the termination of each cycle of driving of the wind motor 18 causes the D-F/F 63 to be reset as the one-shot pulse generating circuit 66 produces the resetting signal. When the cancel switch 80 is turned on, however, the D-F/F 63 is hindered from being reset even by the resetting signal from the one-shot pulse generating circuit 66. By this arrangement, in the present embodiment, while it is in the normal setting that one mode of imprinting the message data (or the second mode) is reset each time one frame is exposed, returning to another mode of imprinting the standard date data (or the first mode), it is when the cancel switch 80 is pushed (when turned on) that repetitive imprinting of the same message data is carried out. The switch 80 has a pull-up resistor 81.

Figure 3:
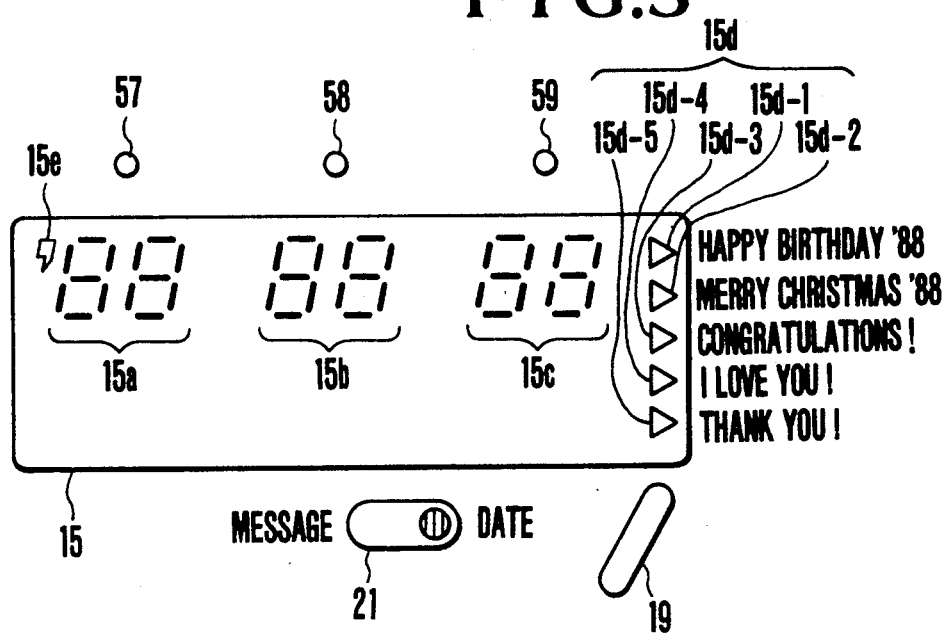

FIG. 3 shows the LCD display position 15 formed on the external surface of the camera housing and knobs for the switches 19 and 21 positioned adjacent thereto. The display contains two digits 15a of a year, two digits 15b of a month, two digits 15c of a day and a row of five display segments 15d-1 to 15d-5 in registry with different message phrases ("HAPPY BIRTHDAY", etc.) printed on the right side of the display portion. In the message imprinting mode, one of these segments 15d-1 to 15d-5 is lighted on, informing the user of what message is now selected to be imprinted on the film.

Next, the switches adjacent the LCD display portion 15 are explained.

The message selection switch 19 is rendered effective when the message mode is selected to operate by the mode selection switch 21 for changing over between the date imprinting mode and the message imprinting mode, and has a push button. Once this push button is depressed, successive selection of one of the five messages is shifted by one in a data memory and, at the same time, successive selection of one of the five pointed segments 15d-1 to 15d-5 is shifted by one in the LCD display. The user can confirm the selected message at the present. The mode selection switch 21 of the present embodiment has a slide knob. When the slide knob is in the right end (or in the position shown in FIG. 3) to select the calendar (date) mode, all the pointed segments 15d-1 to 15d-5 are not illuminated. Conversely when the message mode is selected, the calendar display area having digits 15a to 15c and an apostrophe 15e is quenched. The switches 57 to 59 for correcting the calendar to be imprinted have respective push buttons upon operation to directly correct the numbers in "year", "month" and "day" respectively.

Figure 4:
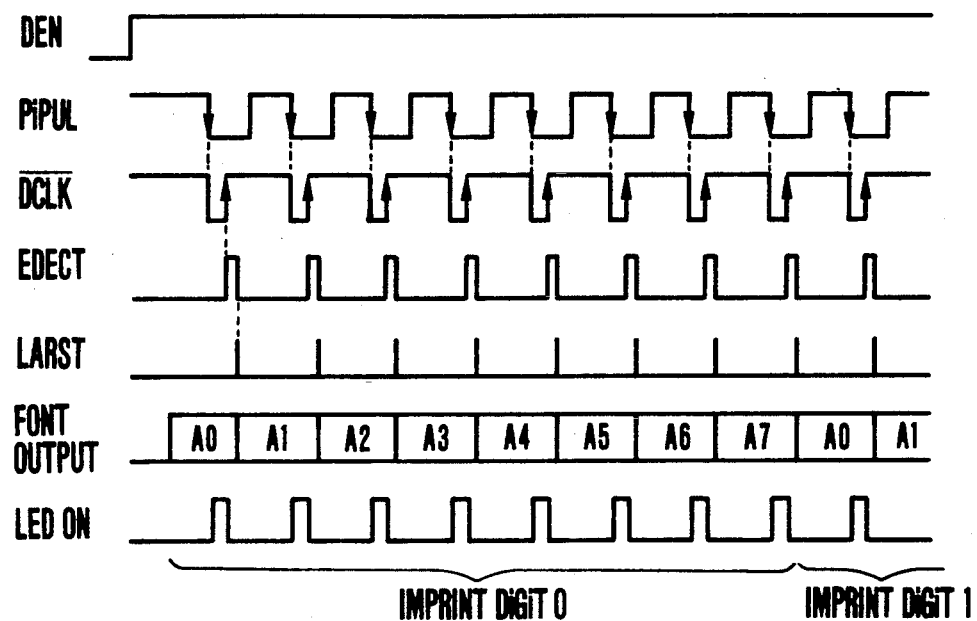

FIG. 4 is a timing chart illustrating the relationship between the pulses representing movement of the film and the produced fonts when imprinting is being carried out.

Figure 5A:
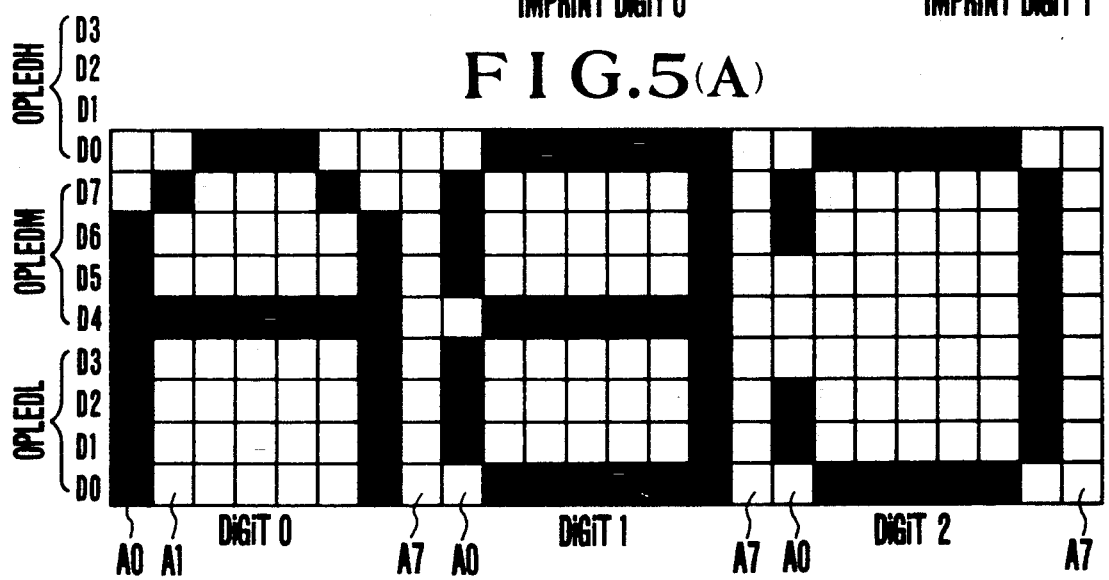
FIG. 5(A) is a diagram to explain the order in which fonts are produced.
Figure 5B:
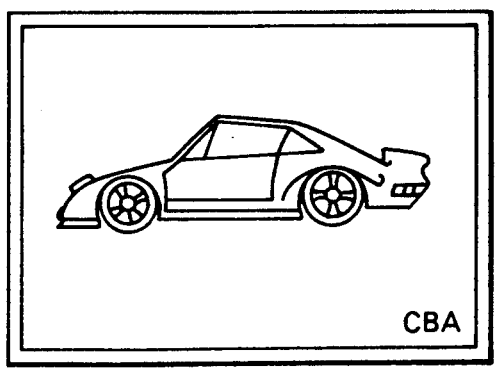
FIG. 5(B) illustrates a photograph having data such as letters imprinted.

FIGS. 5(A) and 5(B) show an example of specific data to be imprinted and imprinted in a photograph. In order to imprint ". . . C, B, A" as will later appear in the printed photograph of FIG. 5(B), the corresponding fonts must be produced in the order shown in FIG. 5(A). As is understandable from these drawings, in the present embodiment, because of its using a special layout of the dot LEDs, the film cartridge and the take-up spool (both not shown) in the camera, an arrangement is made so that when forming the fonts for the row of letters in an order shown in FIG. 5(B), their data are produced in the reverse order from the font data A0 of the rightmost column (the leftmost column in FIG. 5(A)) of the rightmost letter "A" (DiGi0). In the left hand side margin of FIG. 5(A) there are shown the names of ports of the microcomputer 1 from which the data are output when the fonts to be imprinted each are in (9×7) dots. The four bits from the bottom, i.e., D0 to D3, are assigned to the OPLEDL ports, the four bits D4 to D7 to the OPLEDM ports, and the top four bits D0 to D3 (of which the D1 to D3 are not in use) to the OPLEDH ports.

Figures 6, 7:
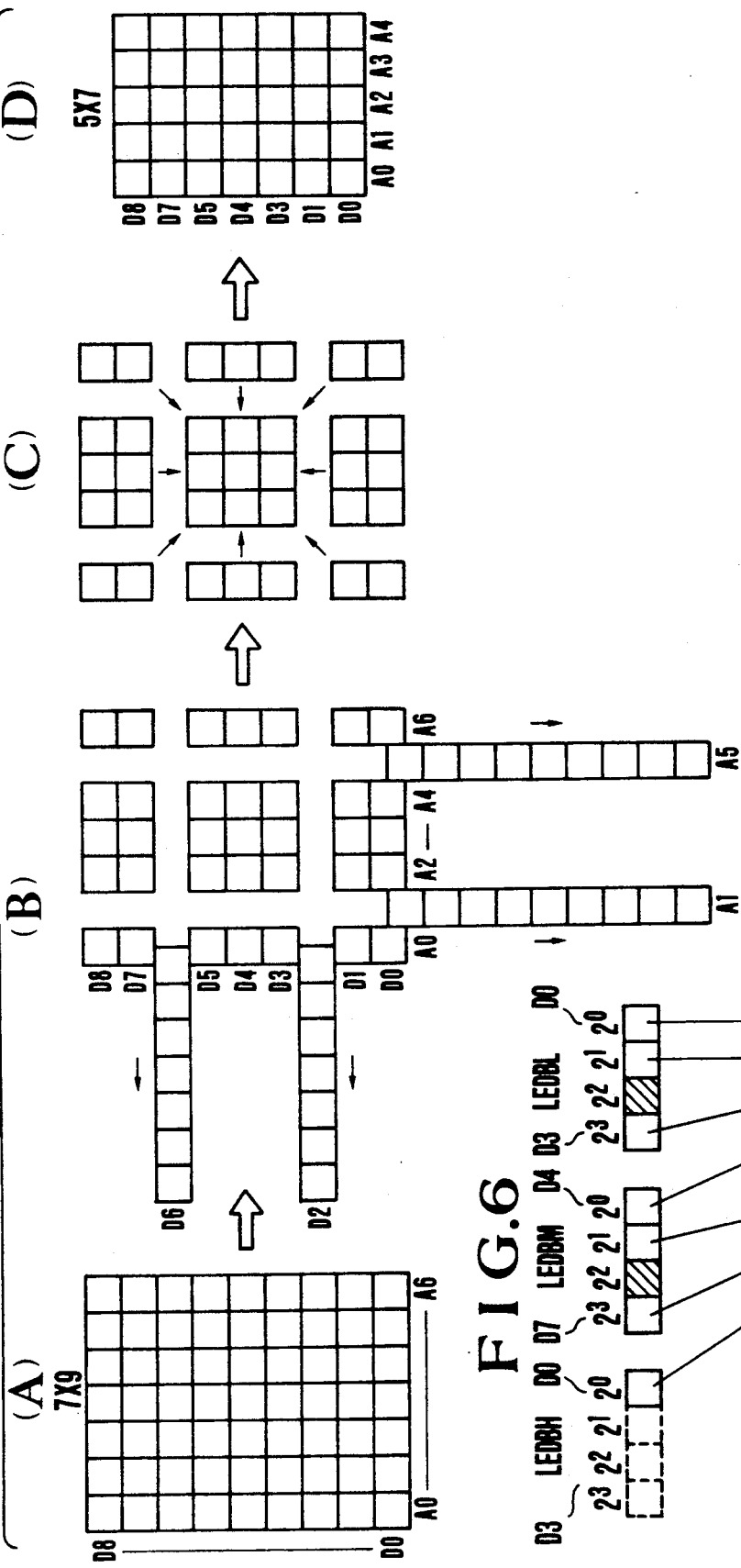
Figure 9:
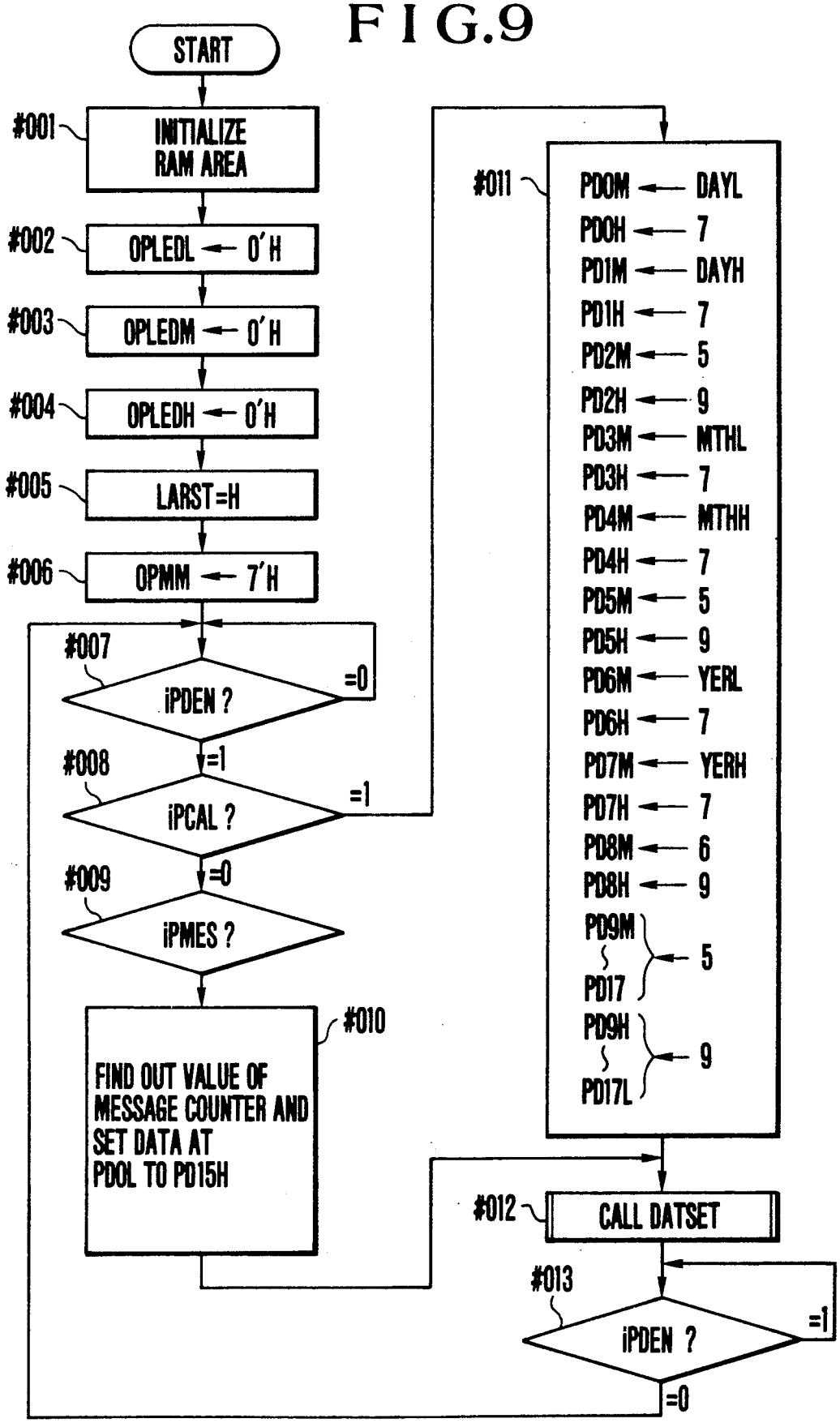

FIG. 6 and FIG. 7 show a method of making a (7×5) dot matrix for fonts from the (9×7) dot matrix for the fonts, as the format size of film alters. In FIG. 5(A), now letting the longitudinal direction be called "row" and the lateral direction "column", contraction in the row direction is performed in such a way that part of the data, namely, the D2 ($2^2$) of the LEDBL of FIG. 6 and the D6 ($2^2$) of the LEDBM, are pulled out, the remaining data are closed to the lower side. Contraction in the column direction is practiced by skipping predetermined addresses (in the example of FIG. 7, A1 and A5) when the fonts are output to the ports.

FIG. 8 shows part of the font data stored in the font data table in the ROM. The address is defined by 16 bits, and the data are described in units of 8 bits. The bits which correspond to the black compartments have "1", and the others have a value of "0". Hence, the data H'7A0 to H'7AF are for a font of "A", H'7B0 to H'7BF for "B", H'7C0 to H'7CF for "C", H'7D0 to H'7DF for "D", . . . H'860 to H'86F for "M", H'8B0 to H'8BF for "R", and H'8F0 to H'8FF for "V".

FIG. 9 to FIG. 13 are flowcharts for the sequence of programs and a table. Also in the following there are a table 1 showing the input and output ports of the microcomputer, the numbers of bits, and their contents, a table 2 and a table 3 showing the data memories in the RAM and their contents, and a table 4 showing the addresses for the font data in the ROM and a list of fonts stored therein.

The memorized fonts are numerals 0 to 9, English letters A to Z, and ten symbols, totaling 46.

A table 5 shows the numerical values of the message counter with the contents of the corresponding messages.

TABLE 1

| The Input and Output Ports of Microcomputer and Their Contents | | | |
|---|---|---|---|
| Port Name | Bit | i/o | Content |
| iPDAYL | DAY0–DAY3 | i | Input data of the counted calendar (day) at unit-place |
| iPDAYH | DAy4–DAY7 | | calendar (day) at 2nd place |
| iPMTHL | MTH0–MTH3 | i | Input data of the counted calendar (month) at unit-place |
| iPMTHH | TH4–7 | | calendar (month) at 2nd plate |
| iPYEARL | YEAR0–YEAR3 | i | Input data of the counted calendar (year) at unit-place |
| iPYEARH | YEAR4–7 | | calendar (year) at 2nd place |
| iPMES | MES 0–MES 2 | i | Input data from message counter |
| CAL | CAL/MES | i | Input imprinting mode selecting signal |
| iPMES | MES 0–MES 3 | i | Input message counter |

TABLE 1-continued

The Input and Output Ports of Microcomputer and Their Contents

| Port Name | Bit | i/o | Content |
|---|---|---|---|
| OPLEDL | LEDL0-3 | | |
| OPLEDM | LEDM0-3 | o | Output fonts to dot LEDs |
| OPLEDH | LEDH | | |
| iPEDECT | EDECT | i | Input DCLK detection |
| OPLARST | LARST | o | Output F/F reset |
| iPDEN | DEN | i | Input imprinting enable |
| iPFiLS | FiLS | i | Input film format size |

TABLE 2

Data Memories in Microcomputer and Their Content (1)

| Address | Memory Name | Content |
|---|---|---|
| 0 0 | MD0 | Calendar day at unit-place |
| 0 1 | MD1 | Calendar day at 2nd place |
| 0 2 | MD2 | Calendar Month at unit-place |
| 0 3 | MD3 | Calendar Year at unit-place |
| 0 4 | MD4 | Calendar Year at 2nd place |
| 1 0 | PD0L | Indicate DiG0 font to be imprinted in lower 4 bits |
| 1 1 | PD0H | Indicate DiG0 font to be imprinted in upper 4 bits |
| 1 2 | PD1L | Indicate DiG1 font to be imprinted in lower 4 bits |
| 1 3 | PD1H | Indicate DiG1 font to be imprinted in upper 4 bits |
| 1 4 | PD2L | Indicate DiG2 font to be imprinted in lower 4 bits |
| 1 5 | PD2H | Indicate DiG2 font to be imprinted in upper 4 bits |
| 1 6 | PD3L | Indicate DiG3 font to be imprinted in lower 4 bits |
| 1 7 | PD3H | Indicate DiG3 font to be imprinted in upper 4 bits |
| 1 8 | PD4L | Indicate DiG4 font to be imprinted in lower 4 bits |
| 1 9 | PD4H | Indicate DiG4 font to be imprinted in upper 4 bits |
| 1 A | PD5L | Indicate DiG5 font to be imprinted in lower 4 bits |
| 1 B | PD5H | Indicate DiG5 font to be imprinted in upper 4 bits |
| 1 C | PD6L | Indicate DiG6 font to be imprinted in lower 4 bits |
| 1 D | PD6H | Indicate DiG6 font to be imprinted in upper 4 bits |
| 1 E | PD7L | Indicate DiG7 font to be imprinted in lower 4 bits |
| 1 F | PD7H | Indicate DiG7 font to be imprinted in upper 4 bits |
| 2 0 | PD8L | Indicate DiG8 font to be imprinted in lower 4 bits |
| 2 1 | PD8H | Indicate DiG8 font to be imprinted in upper 4 bits |
| 2 2 | PD9L | Indicate DiG9 font to be imprinted in lower 4 bits |
| 2 3 | PD9H | Indicate DiG9 font to be imprinted in upper 4 bits |
| 2 4 | PD10L | Indicate DiG10 font to be imprinted in lower 4 bits |
| 2 5 | PD10H | Indicate DiG10 font to be imprinted in upper 4 bits |
| 2 6 | PD11L | Indicate DiG11 font to be imprinted in lower 4 bits |
| 2 7 | PD11H | Indicate DiG11 font to be imprinted in upper 4 bits |
| 2 8 | PD12L | Indicate DiG12 font to be imprinted in lower 4 bits |
| 2 9 | PD12H | Indicate DiG12 font to be imprinted in upper 4 bits |
| 2 A | PD13L | Indicate DiG13 font to be imprinted in lower 4 bits |
| 2 B | PD13H | Indicate DiG13 font to be imprinted in upper 4 bits |
| 2 C | PD14L | Indicate DiG14 font to be imprinted in lower 4 bits |
| 2 D | PD14H | Indicate DiG14 font to be imprinted in upper 4 bits |
| 2 E | PD15L | Indicate DiG15 font to be imprinted in lower 4 bits |
| 2 F | PD15H | Indicate DiG15 font to be imprinted in upper 4 bits |
| 3 0 | PD16L | Indicate DiG16 font to be imprinted in lower 4 bits |
| 3 1 | PD16H | Indicate DiG16 font to be imprinted in upper 4 bits |
| 3 2 | PD17L | Indicate DiG17 font to be imprinted in lower 4 bits |
| 3 3 | PD17H | Indicate DiG17 font to be imprinted in upper 4 bits |

TABLE 3

Data Memories in Microcomputer and Their Content (2)

| Address | Memory Name | Content |
|---|---|---|
| 40 | FNTCNT | Output font digit counter |
| 41 | | |
| 42 | DACL | Data Counter in the lower |
| 43 | DACM | Data Counter in the middle |
| 44 | DACH | Data Counter in the upper |
| 45 | LEDBL | Output power to light on LED in buffer lower place |
| 46 | LEDBM | LED in buffer Middle place |
| 47 | LEDBH | LED in buffer upper place |

TABLE 4

Correspondence Between Font Table Address and Font Date in the ROM

| HiGH | MiD | LOW | Stored Font |
|---|---|---|---|
| 7 | 0 | 0-F | 0 |
| | 1 | 0-F | 1 |
| | 2 | 0-F | 2 |
| | 3 | 0-F | 3 |
| | 4 | 0-F | 4 |
| | 5 | 0-F | 5 |
| | 6 | 0-F | 6 |
| | 7 | 0-F | 7 |
| | 8 | 0-F | 8 |
| | 9 | 0-F | 9 |
| | A | 0-F | A |
| | B | 0-F | B |
| | C | 0-F | C |
| | D | 0-F | D |
| | E | 0-F | E |
| | F | 0-F | F |
| 8 | 0 | 0-F | G |
| | 1 | 0-F | H |
| | 2 | 0-F | I |
| | 3 | 0-F | J |
| | 4 | 0-F | K |
| | 5 | 0-F | L |
| | 6 | 0-F | M |
| | 7 | 0-F | N |
| | 8 | 0-F | O |
| | 9 | 0-F | P |
| | A | 0-F | Q |
| | B | 0-F | R |
| | C | 0-F | S |
| | D | 0-F | T |
| | E | 0-F | U |
| | F | 0-F | V |
| 9 | 0 | 0-F | W |
| | 1 | 0-F | X |
| | 2 | 0-F | Y |
| | 3 | 0-F | Z |
| | 4 | 0-F | - (BAR) |
| | 5 | 0-F | BLANK |

TABLE 4-continued

Correspondence Between Font Table Address and Font Date in the ROM

| HiGH | MiD | LOW | Stored Font |
|---|---|---|---|
| | 6 | 0-F | ' (SINGLE QUOTATION) |
| | 7 | 0-F | : (COLON) |
| | 8 | 0-F | / (SLASH) |
| | 9 | 0-F | , (COMMA) |
| | A | 0-F | ! (EXCLAMATION) |
| | B | 0-F | Year |
| | C | 0-F | Month |
| | D | 0-F | Day |

TABLE 5

The Content of Message Counter and the Content to imprint

| Counted Value | Message to imprint |
|---|---|
| | 1     5     10     15     20 |
| 0 | H A P P Y ⊔ B I R T H D A Y ' □ □ |
| 1 | M E R R Y ⊔ C H R I S T M A S ' □ □ |
| 2 | C O N G R A T U L A T I O N S ! |
| 3 | I ⊔ L O V E ⊔ Y O U ! |
| 4 | T H A N K ⊔ Y O U ! |

Note ⊔ is a blank
⊔ ⊔ are two digits of a year.

Now with the above-described construction and arrangement, when the electric power source is turned on in the camera, the voltage detecting circuit 8 produces a reset pulse. Responsive to this pulse, the microcomputer 1 starts a sequence beginning with START of FIG. 9. Also, since at the same time this reset pulse enters the frequency dividing circuit 10, each of the counters 13, 12 and 11 for year, month and day and the message counter 20, are reset.

In a first step #001, the RAM is cleared of the data stored in the memory area thereof. Then, the values "0" are output at the ports (OPLEDL-H) for controlling the energization of the dot LEDs in steps #002 to #004. In the next step #005, the imprinting pulse detector i.e., the D-F/F 22 is reset.

Thus, it comes to wait for enabling the data to be imprinted. Now assuming that the camera is loaded with film, then the release switch is actuated and, then, the exposure is terminated, referring to FIG. 1, the camera control circuit 16 then produces a signal for driving the wind motor 18 for advancing the film through the length of one frame. This motor drive signal is applied also to the microcomputer 1 at the input port iPDEN. Because iPDEN=1 results, the sequence advances to a step #008, wherein the imprinting mode which has been selected is examined. If it is judged to be the date calendar mode (in other words, if iPCAL=1 is detected), the addresses of those fonts which are used to imprint the data of the calendar alone are set in a step #011. Here the first digit (DAYL) of the calendar number in day is loaded into the middle address (PD0M) for indicating the font of the least significant digit (DiGiT0) to be imprinted, while "7" is loaded into the upper address (PD0H). With this, by reference to the ROM font table (Table 4), for "7" of the upper address, the same font as the value of the middle address is stored. In this case, therefore, the indicated font for the lowest place is used to imprint the value of the first digit (DAYL) of the number of days. Similarly, for the next place to imprint, the value of the second digit (DAYH) of the number of months in the calendar. The font to be next imprinted in the third place (DiGiT2) counting from the lowest place is indicated by "5" in the middle address (PD2M) and "9" in the upper address (PD2H), thus being the one for blank (see Table 4). Subsequently, in a similar way, the DiGiT3 is loaded with the first digit of a number of months, the DiGiT4 with the second digit of the number of months, the DiGiT6 with the first digit of a number of years, the DiGiT7 with the second digit of the number of years, the DiGiT8 with "'(single quotation)", and the DiGiT5 and DiGiT9 to DiGiT1 each with the address of the font for blank.

Meanwhile, in the step #008, if the selected mode is judged to be the message one (iPCAL=0), the value of the message counter 20 is examined in a step #009 and a step #010 to see which message has been selected to imprint, and the addresses of the found fonts are set. In FIG. 10, all the messages to be imprinted are related to the font addresses to be set in the places to imprint. In the present embodiment, when the content of the message counter is, for example, "0", the message: "HAPPY BIRTHDAY" followed by the data in "year" is imprinted in the following way:

That is, the DiGiT0 and DiGiT1 have the fonts (yL and yH) set therein of the first and second digits of the number of years at the given time. Since the DiGiT2 has the font for "'(single quotation)" and its address loaded therein, and the DiGiT3 through the DiGiT17 have the fonts for "YADHTRIB⊔YPPAH⊔"(where ⊔ represents a blank) and their addresses loaded, because, in this case, as has been described before, the set of fonts are formed from the last letter, the fonts are successively indicated so that "⊔HAPPY⊔BIRTHDAY '88" (where the given year on the calendar is 1988, yL=yH=8) will appear on the print. Likewise for "1" in the content of the message counter, "MERRY⊔CHRISTMAS 'yH yL"; for "2", "⊔ ⊔CONGRATULATIONS !"; for "3", "⊔. . . ⊔I⊔LOVE YOU !"; and for "4","⊔. . . ⊔THANK⊔YOU ⊔". Here in the three cases where the counter has values of "2", "3" and "4", those portions of the data for the date which are assigned to the number in year are not imprinted as will be understood from FIG. 10.

After such a judgment of the mode and such an indication of the fonts have been done, a DATSET subroutine is called and the real fonts are output.

The DATSET subroutine is explained by reference to the flowchart of FIG. 11.

In the first step #100, the content of the middle place (PD0M) of the address for indicating the font for the first place (the lowest place in the print) DiGiT0 is loaded to the middle place (DACM) of a 12-bit (4 bits ×3) counter for indicating the address at the time of referring to the data table.

In the next step #101, likewise the content of the upper place (PD0H) of the address for font indication is also loaded to the upper place (DACH) of the data counter and a FNTOUT subroutine for actually outputting the fonts is called. Here, suppose the DiGiT0 produces the font for "A", then the DACM and DACH are made to be DACH=7 and DACM=A.

Figure 12:
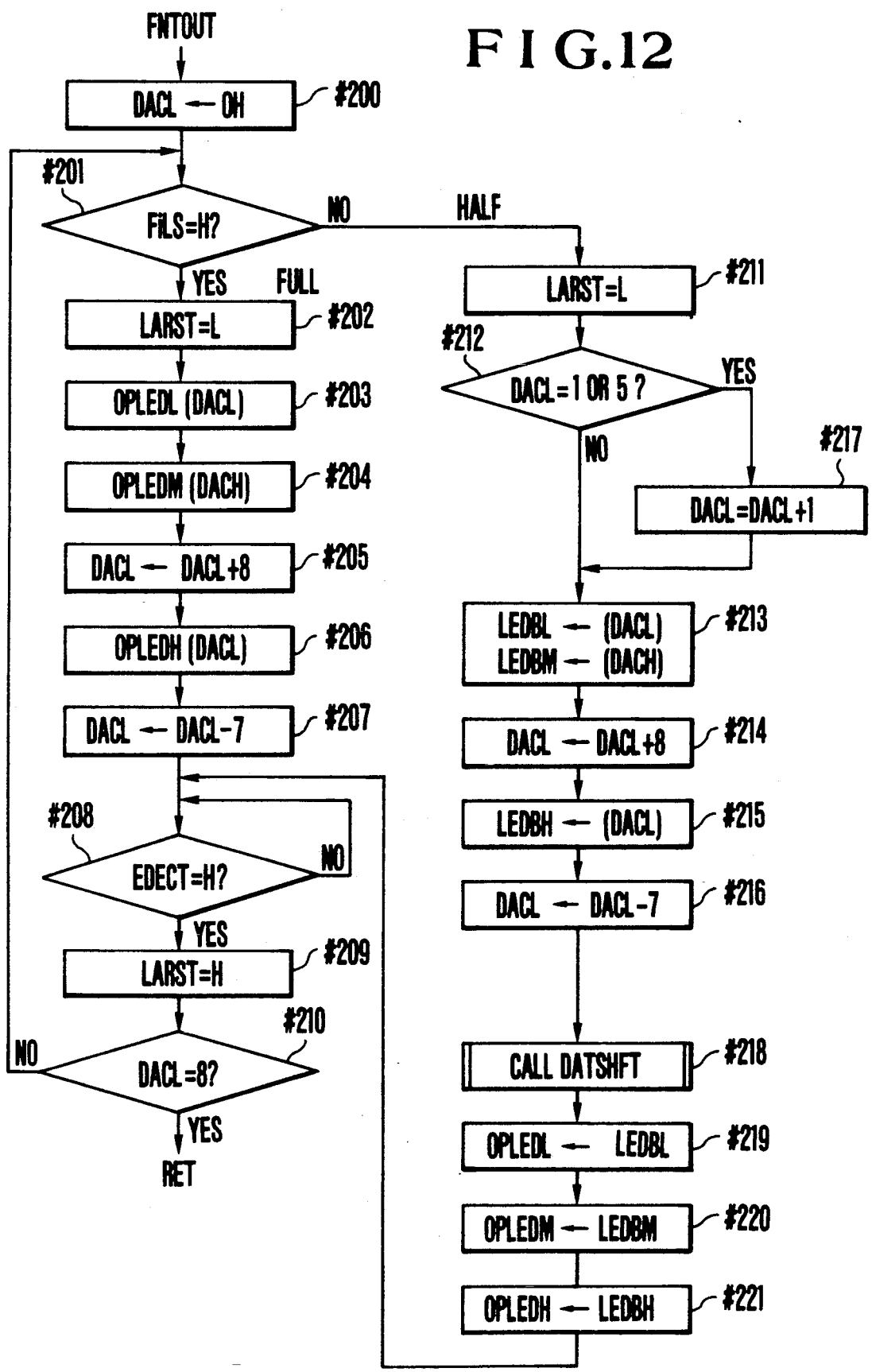

The FNTOUT subroutine is explained by reference to FIG. 12. In the first step #200, the value for the lowest place (DACL) of the data counter is set to "0". Which film format size has been selected is examined in the next step #201. If it is judged to be the full size (iP(FiLS)=1), the program advances to a step #202 where the D-F/F 22 for detecting the imprinting control pulse is released from the reset state when OPLARST=L is set. In the next step #203, the lower 4 bits representing the content of the data of the ROM address that the data counter (DAC) indicates are output to the OPLEDL ports. In more detail, taking the aforesaid example of production of "A" from the DiGiT0, since the content of the data counter (DAC) is H'7A0, its ROM address has a data whose lower 4 bits are B'1111 (see the font diagram of "A" in the left upper corner of FIG. 8).

Then, the upper 4 bits (DACH) representing the content of the data stored in the ROM address that the data counter indicates are output to the OPLEDH ports in a step #204. (In the aforesaid case of the font for "A", these 4 bits become B'0011.) Further in the next step #205, "8" is added to the value of the lower place (DACL) of the data counter. The data of the lower 4 bits of that ROM address which the data counter with that addition result indicates are output to the OPLFDH ports. In the case of "A", DAC=H'7A8 results. Hence, the data of the lower 4 bitsd are B'0000. Although, in the embodiment, the top three bits are not connected to the output ports, such an execution of the step #203, the step #204 and the step #206 results in a state that the data of the font are appearing at the ports (OPLEDL-OPLEDH) for the output of controlling the energization of the LEDs. The sequence then advances to a step #207 where "7" is subtracted from the DACL and therefrom to a step #208 of waiting for arrival of the rising edge of an imprinting pulse. When the rising edge enters the clock input of the D-F/F 22, it changes its output Q to H (iPEDECT-H). Advance to a step #209 then occurs to reset the D-F/F 22. Here to explain the definition of the actual time of lighting on the LED, as is apparent from the timing chart of FIG. 4, the LED is lighted on when the logical product of the three signals, namely, the output of the font in 9 bits (LEDL0-3, LEDM0-3 and LEDH0), the inverted signal of the imprinting pulse and the enable signal, takes place (see FIG. 1). On that bit of the output of the font at which "1" is output, therefore, the period of lighting on the LED is limited to the period for which the imprinting pulse ($\overline{DCLK}$) is maintained at a low level. Also, the reason for detecting the rising edge of the imprinting pulse ($\overline{DCLK}$) is that the termination of energization of the LEDs for one line of the font has to be followed by setting the data for the next line of that font.

Then, whether the lower digit (DACL) of the data counter has become "8" is examined in a step #210. If below "8", the procedure beginning with the step #201 is repeated again. That is, in order for this repetition to cause the next line of the font to be output, the preceding flow is made to include the addition of "8" to the lower digit (DACL) of the data counter (#205) followed by the subtraction of "7" (#207) with the result of +1. Thus, the data counter DAC is caused to designate the data for the next column. In the case of "A", (DAC)=H'7A1 results.

Here at the termination of the output of the last column (in the case of "A", H'7A7 and H'7AF) the DACL becomes "8". Hence, branch at the step #210 occurs to end the subroutine FNTOUT and the program returns. Meanwhile, if the format size is determined in the step #201 to be the half one (or FiLS=L), the process more or less alters, although it is unchanged up to the step #211 of releasing the imprinting pulse detector or D-F/F 22 from the resetting. For the cases that the lower digit of the data counter is either of "1" and "5" sensed in a step #212, the DACL is one incremented in a step #217. For the case that the DACL is neither of "1" and "5", skip occurs. With this, the two columns A1 and A5 are taken out from the (9×7) matrix of the font. So the total number of columns becomes "5" (see FIG. 7(B)). After this, the data of that ROM address which is designated by the data counter are not placed directly to the output ports (OPLEDL-M) for lighting on the LEDs, but once transferred to the buffer RAM (LEDBL, LEDBM, LEDBH) in a step #213 and a step #215. In a step #218, therefore, a subroutine DATSHFT for shifting the data in part is called.

Figure 13:
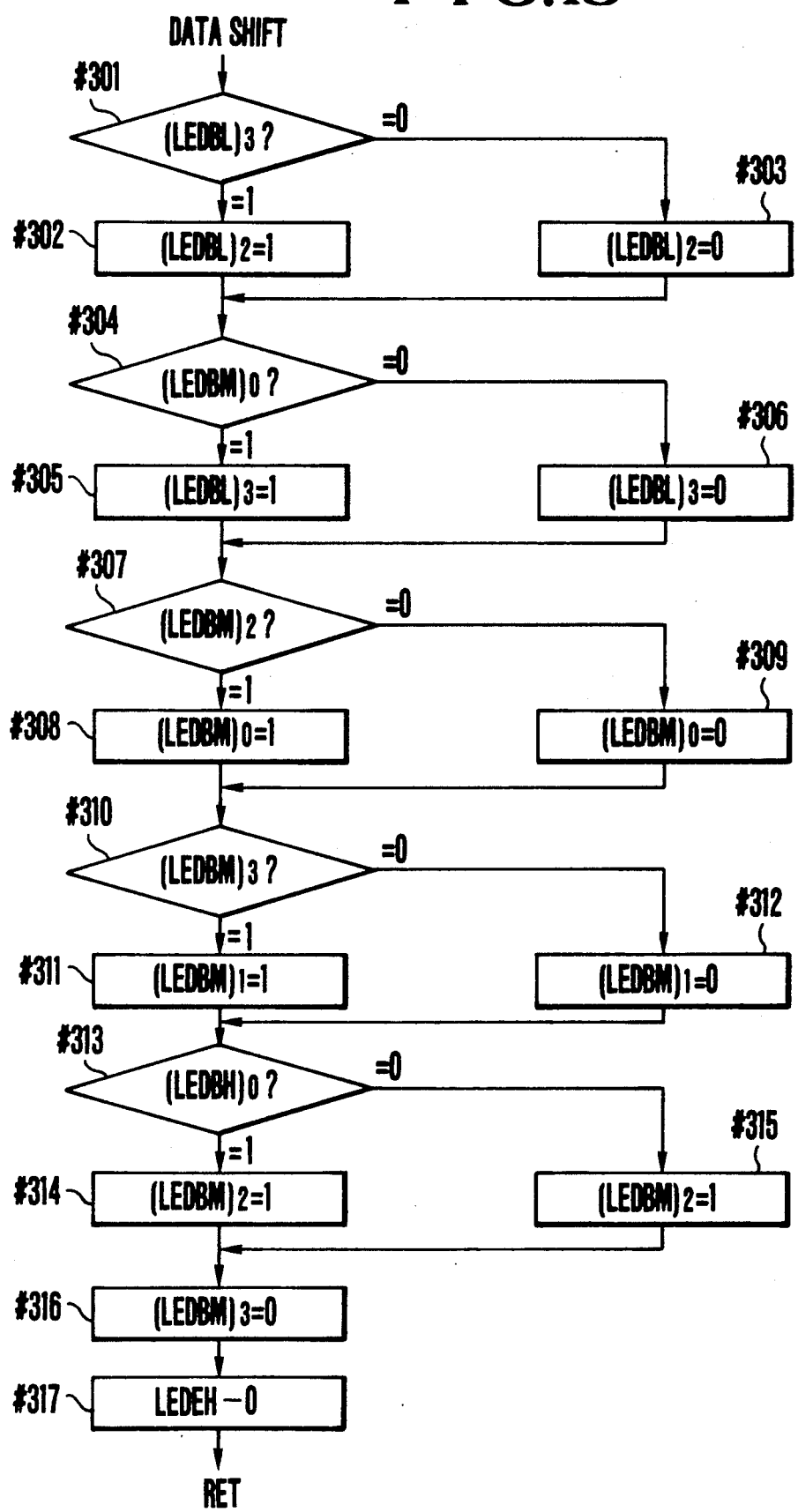

This DATSHFT subroutine is explained by reference to FIG. 13. Step #301: The $2^3$ place of the content of the LEDBL (in FIG. 13, displayed as (LEDBL)$_3$: the same applies below) is examined. Its value is transferred to the $2^2$ place (#302 and #303).

Step #304: The $2^0$ place of the LEDBM is examined. Its value is transferred to the $2^3$ place of the LEDBL (#305, #306).

Step #307: The $2^2$ place of the LEDBM is examined. Its value is transferred to the $2^0$ place of the LEDBM (#308. #309).

Step #310: The $2^3$ place of the LEDBM is examined. Its value is transferred to the $2^1$ place of the LEDBM (#311, #312).

Step #313: The $2^0$ place of the LEDBH is examined. Its value is transferred to the $2^2$ place of the LEDBM (#314, #315).

Step #316: The $2^3$ place of the LEDBM is set to "0".

Step #317: The LEDBH is set to H'0. Thereby (with reference to FIG. 6), the data for the two rows D2 and D6 from the 9×7 matrix of the font are extracted and the remaining ones are shifted to the lower places. Thus, the total number of rows becomes "7" (see FIG. 7(B)).

Now, when this process for shifting the data ends, the step #219 to the step #221 are executed to place the shifted data on the output ports (OPLEDL-H) for lighting the LEDs. The subsequence process is the same as that when with the full format size (#208-#210...). In such a way, the fonts to be imprinted for one letter are output. After this, DACL=8 results. At the step #210, therefore, the program goes out of the subroutine FNTOUT. From the step #103, the fonts for the next letter (DiGiT1) are output in a similar way to that described in connection with the DiGiT0. In short, within the DATSET subroutine, the head address of the fonts for each letter is set to call the FNTOUT subroutine, thereby actually placing the fonts on the LED output ports.

Here since the last column (A7) of the font for each letter contains the blank pattern for the space of one column (in the case of DACL=h'7 or H'F), the successive two of the imprinted letters are spaced apart by a blank of width equal to that of one dot.

In such a way, up to the last letter (DiGiT17) is imprinted. Then, the program returns from the DATSET subroutine. In the step #013 of FIG. 9, the wind motor 18 stops and the disenabling of the imprinting is waited for. When disenabled, the imprinting operation of the next film frame is waited for again (see the step #007). Thus, the sequence of imprinting a series of continuous data is completed.

In connection with the formation of the font of (7×5) dots from the font of (9×7) dots, it should be noted that since the omission and compression of the data is done according to a certain pattern, the font patterns must be chosen so as to attain good shape and not to increase the difficulty of design, as a matter of course.

Though in the embodiment of FIG. 3 the calendar imprint mode is operated with "Year, Month, Day" in this only one order, so that the display is constructed only with the digits 15a for the number of years, digits 15b for the number of months, the digits 15c for the number of days and the single quotation mark 15e representing the discrimination of the year number, additional display segments may otherwise be used for displaying the months in English and the times. And, in the device of the present embodiment, there is a feature that if the foregoing imprinting operation is done in the message mode (or the second mode), the device automatically returns to the date data imprint mode (or the first mode) after the camera release is completed.

In more detail, in the device of the present embodiment, as has already been described before, after a camera release is actuated, in the timing with the completion of the winding operation, the falling edge enters the one-shot pulse generating circuit 66. Because the one shot pulse generating circuit 66 produces a pulse of predetermined duration, if at this time the cancel switch 80 is on (as it stands normal), the Q output of the D-F/F 63 at the time of H causes the OR gate 65 to produce an output of H level. Thus, the D-F/F 63 is reset. When reset, the $\overline{Q}$ output of the D-F/F 63 changes to H. Therefore, the iPCAL input of the microcomputer 1 becomes H. Hence, the message imprint mode shifts to the date mode. Also, this $\overline{Q}$ output is applied to the LCD driver 14 too. The external LCD display is changed over to the corresponding mode.

If the cancel switch 80 is manipulated to turn off (or the automatic return to the date mode is canceled), the above-described mode change does not take place. Hence, it is made possible to shoot a plurality of film frames under the condition that the same message is imprinted. It should be noted that the cancel switch 80 may be arranged to return to the normally closed state when the electric power source is turned on/off, or the film cartridge is exchanged with a new one.

Figure 14:
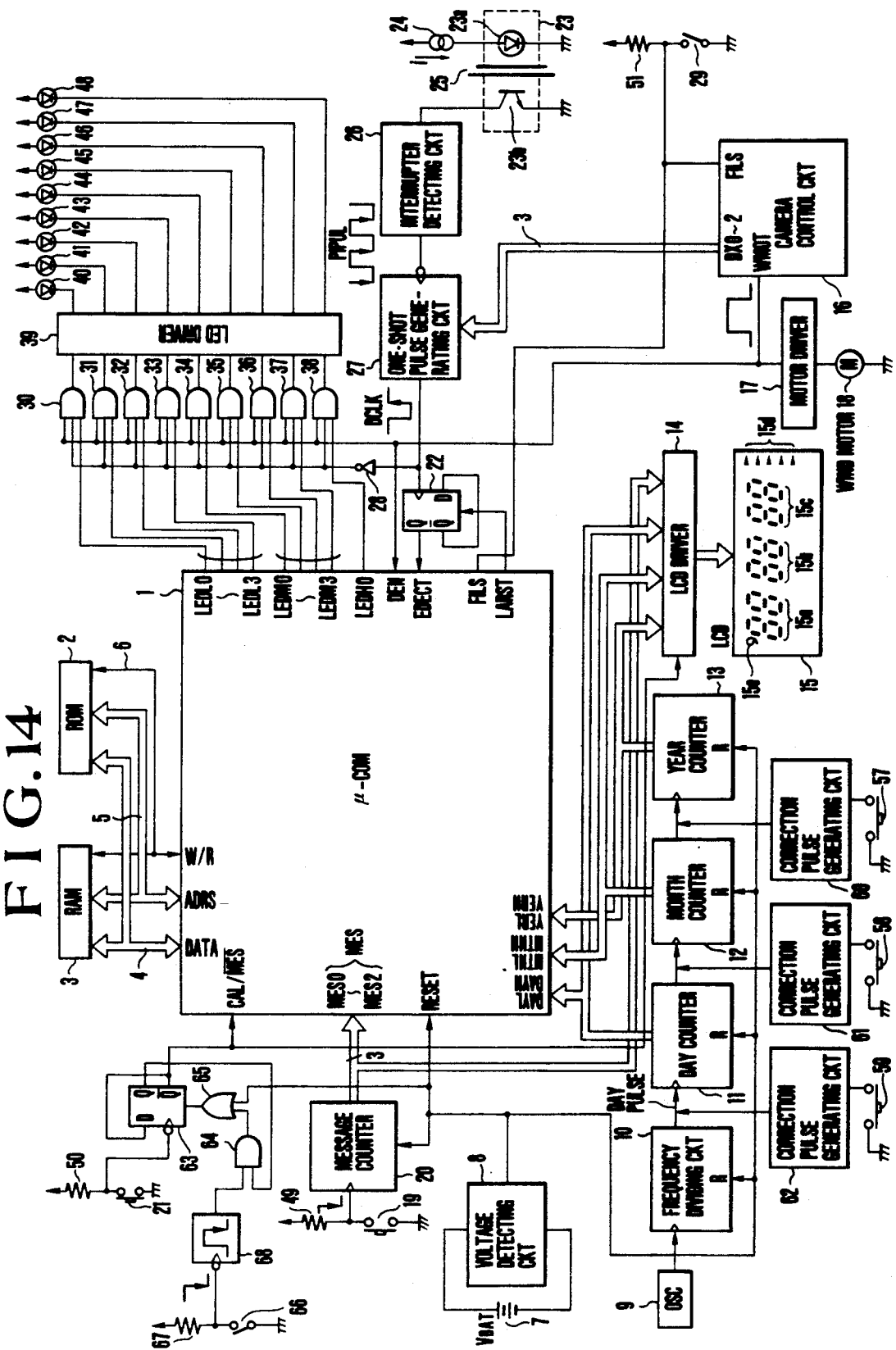
FIG. 14 to FIG. 16 are electric circuit diagrams of the entirety of second to fourth embodiments of the devices of the invention respectively.

FIG. 14 shows a second embodiment of the invention wherein the automatic return to the date data imprint mode (or the first mode) is made responsive to the opening operation of the back cover of the camera. For this purpose, a switch 66 is arranged to turn on when the back cover of the camera is opened, and off when closed. A pull-up resistor 67 is connected to this switch. Responsive to the falling edge of the output of the switch 66, a one-shot pulse generating circuit 68 produces one pulse of predetermine duration.

Even with a device of such construction, if the Q output of the D-F/F 63 is H (or the message imprint mode is in operation), the opening of the back cover resets the D-F/F 63, causing automatic return to the first mode. The other features are the same as those of FIG. 1.

Figure 15:
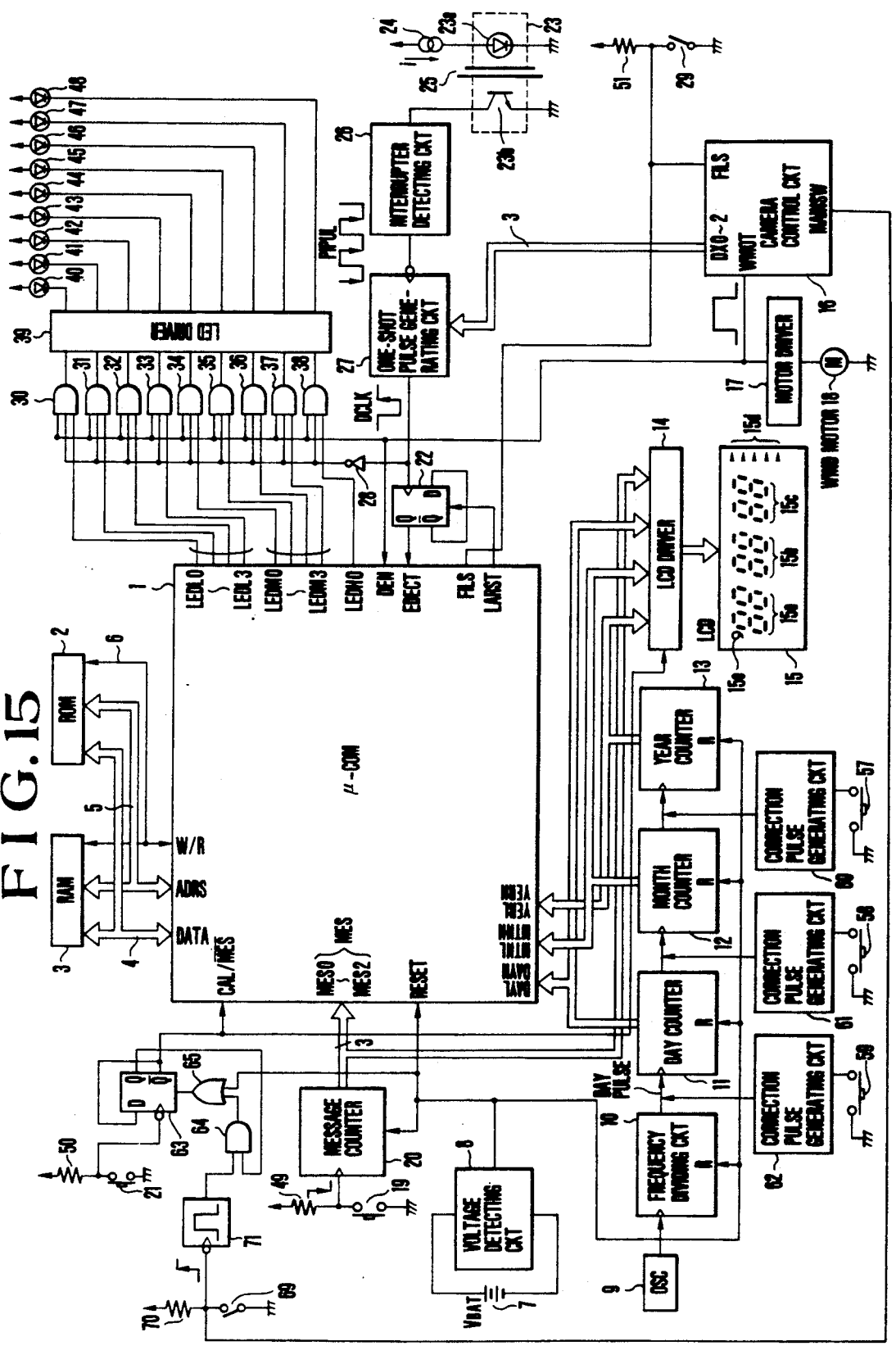

FIG. 15 shows a third embodiment of the invention wherein the automatic return to the date data imprint mode (the first mode) is made responsive to the on-to-off operation of the main switch of the camera.

That is, the main switch 69 controls the operation of the electrical system of the camera in such a manner that when on, the system is rendered able to operate, and when off, unable to operate. A pull-up resistor 70 is connected to the switch 69. Responsive to the falling edge of the output of the switch 69, a one-shot pulse generating circuit 71 produces one shot of predetermined duration. The output of the main switch 69 is also connected to an input terminal MAiNSW of the camera control circuit 16. Even with a device of such construction, when the main switch 69 turns off, the D-F/F 63 is reset by the output pulse of the one-shot pulse generating circuit 71, causing automatic return to the first mode. The other features are the same as those of the second embodiment.

Figure 16:
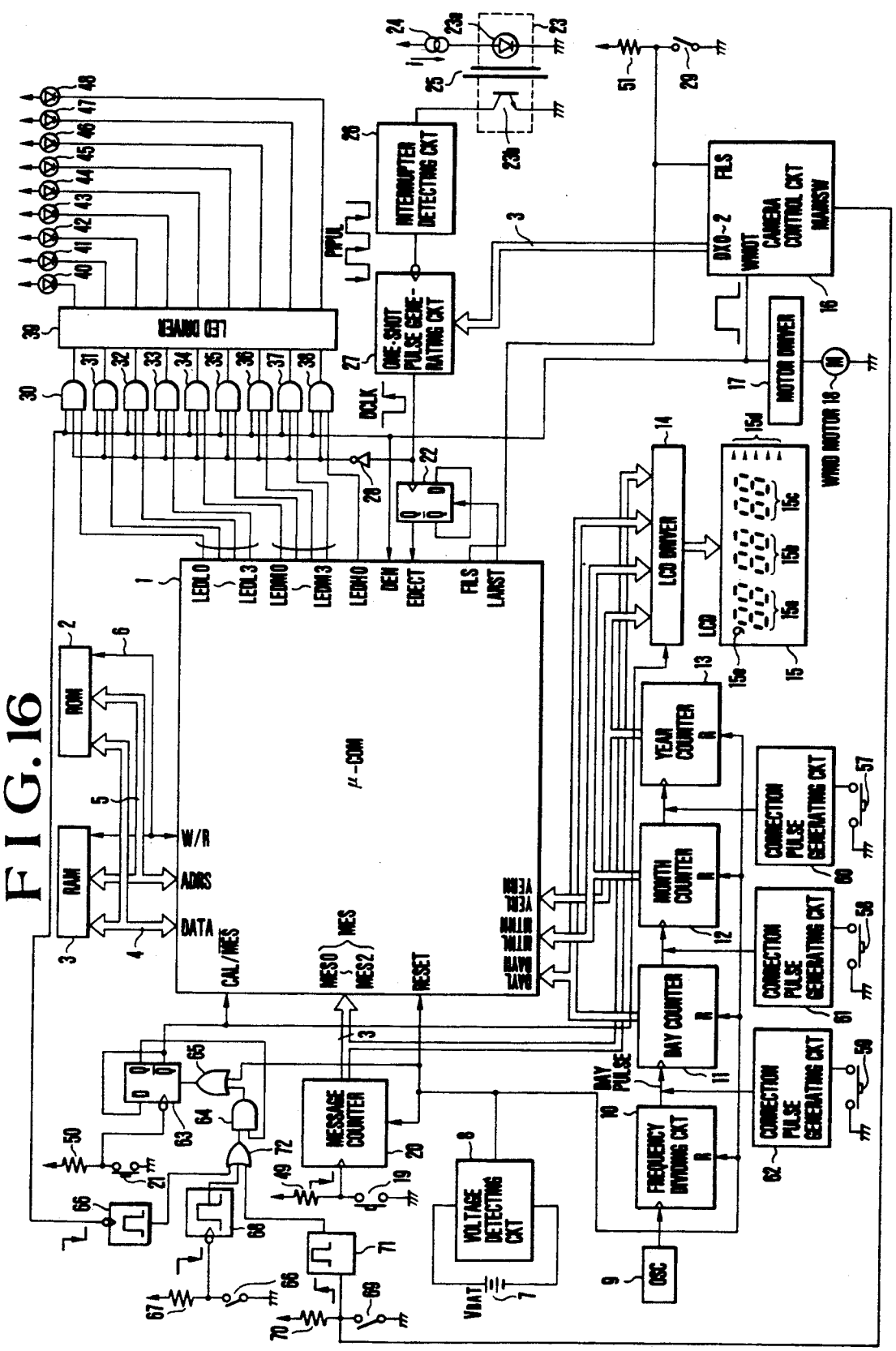

FIG. 16 shows a further or fourth embodiment of the invention wherein the automatic return to the date data imprint mode (the first mode) is made responsive to one of three events: (1) The shutter is released; (2) The back cover is opened; and (3) The main switch is manipulated to turn from on to off.

For this purpose, a 3-input OR gate 72 is used, so the application of H to any one of these inputs resets the D-F/F 63. Therefore, the message mode automatically shifts to the date mode.

It is needless to say that even in any of the foregoing second to fourth embodiments, the cancel switch for preventing the second mode from automatically returning to the first mode may be provided as arranged in a similar way to that of FIG. 1.

Next, a fifth embodiment of the invention is described. Though in the first embodiment the font of $(9 \times 7)$ dots has been in the longitudinal direction of the rows $D_2$ and $D_6$ when $9 \rightarrow 7$ contraction is done as shown in FIG. 7, the rows $D_1$ and $D_7$ may otherwise be drawn instead as shown in FIG. 17. Also, for this case, the $9 \times 7$ fonts have to be designed in view of the requisite that despite the omission of the rows $D_1$ and $D_7$, the rearranged fonts to $(7 \times 5)$ do not provide the letters of unnatural form.

Figure 19:
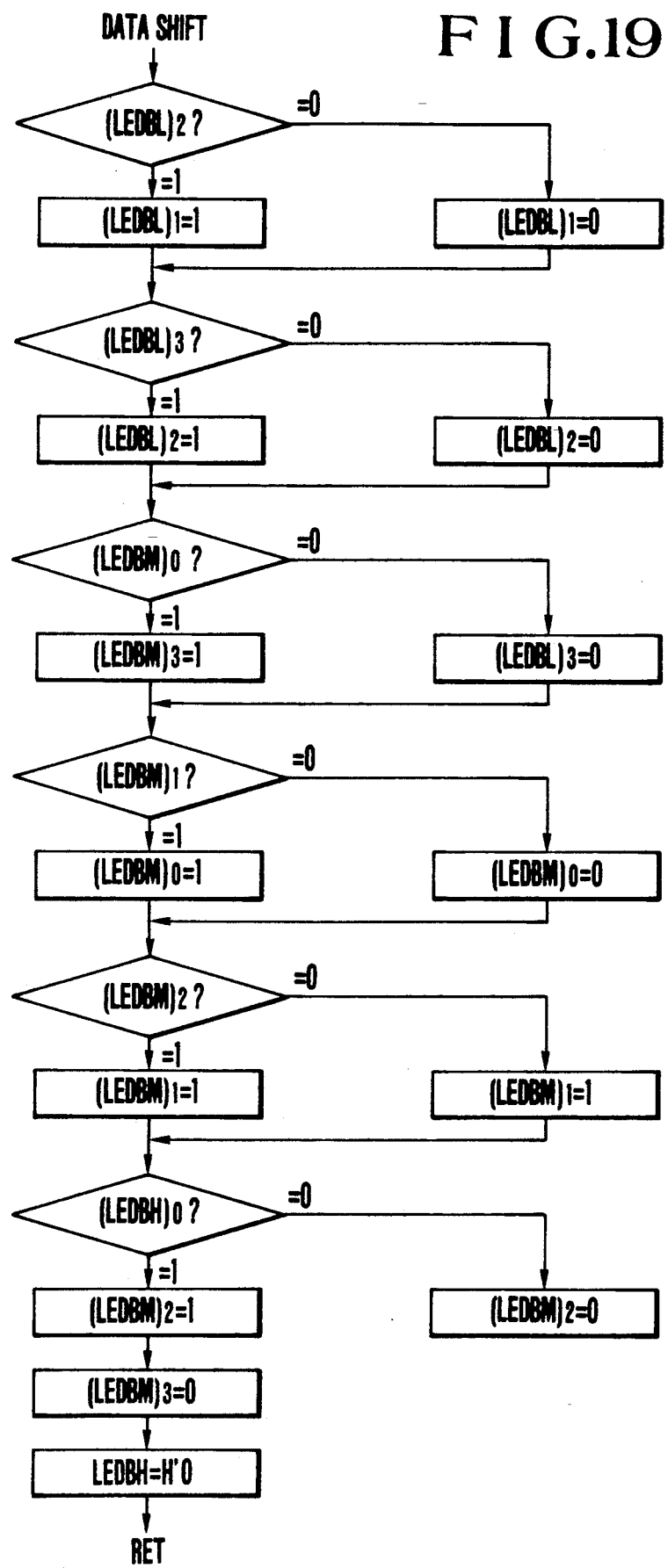

The method of shifting the data which is usable in this case and a flowchart therefor are shown in FIG. 18 and FIG. 19.

Another example of modification may be made such that, suppose as the dot number of the first set of fonts, $(7 \times 5)$ is taken, then contraction is done only in the longitudinal direction by pulling two out of the rows. Thus a second set of fonts are formed in $(5 \times 5)$ dots.

Figure 20:
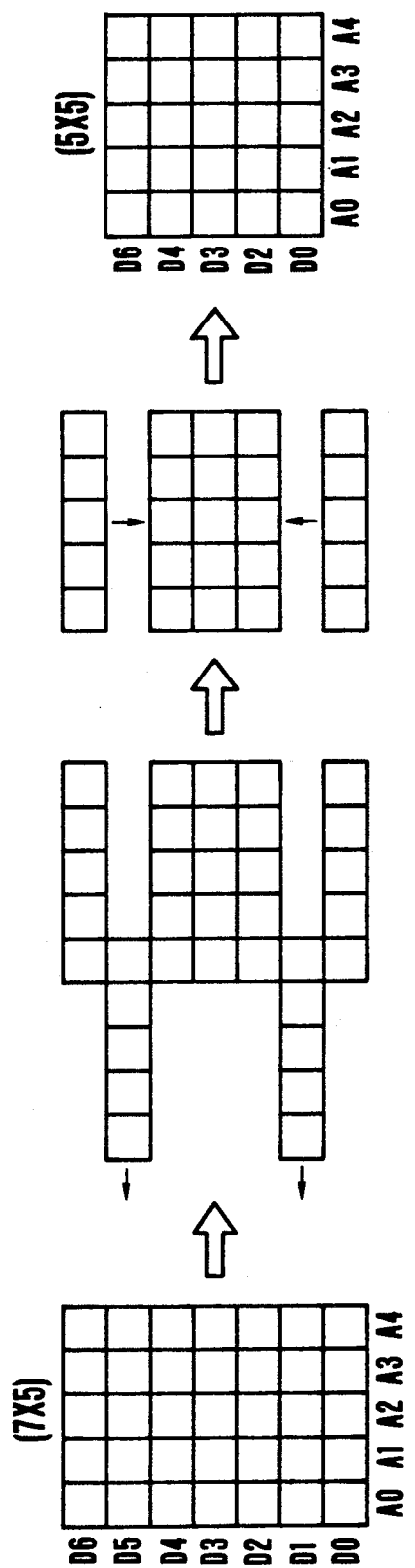
FIG. 20 is a diagram illustrating the shifting of the data in a sixth embodiment of the invention.

A data shifting method adapted to this case is shown in FIG. 20.

Though the foregoing embodiments have been described each on the premise of their application to the imprinting on the photographic film, it is to be understood that the invention is applicable even to the cameras which employ any other types of photographic material.

What is claimed is:
1. A data imprinting device for a camera comprising:
   (A) memory means for previously storing a plurality of messages;
   (B) imprinting means for imprinting a message stored in said memory means on a photosensitive means, said imprinting means including means for imprinting time data on said photosensitive means; and
   (C) selecting means for selecting a message to be imprinted by said imprinting means from among said plurality of messages, said imprinting means further including means for automatically selecting whether or not the time data are to be imprinted with said message in response to the selection of said message to be imprinted.

2. A device according to claim 1, wherein said imprinting means includes means for automatically changing the kind of time data to be imprinted with said message in response to the selection of said messages to be imprinted.

3. A device according to claim 1, wherein said selecting means includes means for manually operating the selection.

4. A data imprinting device for a camera comprising:
(A) memory means for previously storing a plurality of messages;
(B) imprinting means for imprinting a message stored in said memory means on a photosensitive means, said imprinting means including means for imprinting time data on said photosensitive means; and
(C) selecting means for selecting a message to be imprinted by said imprinting means from among said plurality of messages, said imprinting means further including means for automatically changing the kind of time data to be imprinted with said message in response to the selection of said message to be imprinted 5. A device according to claim 4, wherein said selecting means includes means for manually operating the selection.

6. A data imprinting device for a camera comprising:
(A) memory means for previously storing a plurality of messages;
(B) imprinting means for imprinting a message stored in said memory means on a photosensitive means;
(C) selecting means for selecting a message to be imprinted by said imprinting means from among said plurality of messages; and
(D) cancel means for automatically canceling the imprinting of the message by said imprinting means.

7. A device according to claim 6, wherein said cancel means includes means for responding to one cycle of camera operation.

8. A device according to claim 7, further comprising: hindering means for hindering the action of said cancel means.

9. A device according to claim 6, wherein said cancel means includes means for responding to exchange of said photosensitive means.

10. A device according to claim 6, wherein said cancel means includes means for responding to an on/off condition of an electric power source of the camera.

11. A device according to claim 6, further comprising:
hindering means for hindering the action of said cancel means.

12. A device according to claim 6, wherein said selecting means includes means for manually operating the selection.

13. A device according to claim 6, wherein said cancel means includes means for responding to the opening and closing of a back lid of a camera.

14. A device according to claim 6, wherein said cancel means includes means for responding to a main switch of a camera.

15. A data imprinting device for a camera comprising:
(A) memory means for previously storing a plurality of messages;
(B) imprinting means for imprinting a message stored in said memory means on a photosensitive means; and
(C) selecting means for selecting a message to be imprinted by said imprinting means from among said plurality of messages,
said imprinting means including means for forming said message to be imprinted in a dot matrix, said imprinting means further including means responsive to decrease of the format size of said photosensitive means for decreasing the size of the message to be imprinted by removing some of rows or columns of said dot matrix.

16. A device according to claim 15, wherein said selecting means includes means for manually operating the selection.

17. A camera comprising:
(A) memory means for previously storing a plurality of messages;
(B) imprinting means for imprinting a message stored in said memory means on a photosensitive means, said imprinting means including means for imprinting time data on said photosensitive means; and
(C) selecting means for selecting a message to be imprinted by said imprinting means from among said plurality of messages, said imprinting means further including means for automatically selecting whether or not the time data are to be imprinted with said message in response to the selection of said message to be imprinted.

18. A camera according to claim 17, wherein said imprinting means includes means for automatically changing the kind of time data to be imprinted with said message in response to the selection of said message to be imprinted.

19. A camera according to claim 17, wherein said selecting means includes means for manually operating the selection.

20. A camera comprising:
(A) memory means for previously storing a plurality of messages;
(B) imprinting means for imprinting a message stored in said memory means on a photosensitive means, said imprinting means including means for imprinting time data on said photosensitive means; and
(C) selecting means for selecting a message to be imprinted by said imprinting means from among said plurality of messages, said imprinting means further including means for automatically changing the kind of time data to be imprinted with said message in response to the selection of said message to be imprinted.

21. A camera according to claim 20, wherein said selecting means includes means for manually operating the selection.

22. A camera comprising:
(A) memory means for previously storing a plurality of messages;
(B) imprinting means for imprinting a message stored in said memory means on a photosensitive means;
(C) selecting means for selecting a message to be imprinted by said imprinting means from among said plurality of messages; and
(D) cancel means for automatically canceling the imprinting of the message by said imprinting means.

23. A camera according to claim 22, wherein said cancel means includes means for responding to one cycle of camera operation.

24. A camera according to claim 23, further comprising: hindering means for hindering the action of said cancel means.

25. A camera according to claim 22, wherein said cancel means includes means for responding to exchange of said photosensitive means.

26. A camera according to claim 22, wherein said cancel means includes means for responding to an on/-off condition of an electric power source of the camera.

27. A camera according to claim 22, further comprising: hindering means for hindering the action of said cancel means.

28. A camera according to claim 22, wherein said selecting means includes means for manually operating the selection.

29. A camera according to claim 22, wherein said cancel means includes means for responding to the opening and closing of a back lid of a camera.

30. A camera according to claim 22, wherein said cancel means includes means for responding to a main switch of a camera.

31. A camera comprising:
(A) memory means for previously storing a plurality of messages;
(B) imprinting means for imprinting a message stored in said memory means on a photosensitive means; and
(C) selecting means for selecting a message to be imprinted by said imprinting means from among said plurality of messages,
said imprinting means including means for forming said message to be imprinted in a dot matrix, said imprinting means further including means responsive to decrease of the format size of said photosensitive means for decreasing the size of the message to be imprinted by removing some of rows or columns of said dot matrix.

32. A camera according to claim 31, wherein said selecting means includes means for manually operating the selection.

33. A data recording device for a camera comprising:
(A) memory means for previously storing a plurality of messages;
(B) recording means for recording a message stored in said memory means on a recording medium, said recording means including means for recording time data on said recording medium; and
(C) selecting means for selecting a message to be recorded by said recording means from among said plurality of messages, said recording means further including means for automatically selecting whether or not the time data are to be recorded with said message in response to the selection of said message to be recorded.

34. A device according to claim 33, wherein said recording means includes means for automatically changing the kind of time data to be recorded with said message in response to the selection of said message to be recorded.

35. A device according to claim 33, wherein said selecting means includes means for manually operating the selection.

36. A data recording device for a camera comprising:
(A) memory means for previously storing a plurality of messages;
(B) recording means for recording a message stored in said memory means on a recording medium, said recording means including means for recording time data on said recording medium; and
(C) selecting means for selecting a message to be recorded by said recording means from among said plurality of messages, said recording means further including means for automatically changing the kind of time data to be recorded with said message in response to the selection of said message to be recorded.

37. A device according to claim 36, wherein said selecting means includes means for manually operating the selection.

38. A data recording device for a camera comprising:
(A) memory means for previously storing a plurality of messages;
(B) recording means for recording a message stored in said memory means on a recording medium;
(C) selecting means for selecting a message to be recorded by said recording means from among said plurality of messages; and
(D) cancel means for automatically canceling the recording of the message by said recording means.

39. A device according to claim 38, wherein said cancel means includes means for responding to one cycle of device operation.

40. A device according to claim 39, further comprising: hindering means for hindering the action of said cancel means.

41. A device according to claim 38, wherein said cancel means includes means for responding to exchange of said recording medium.

42. A device according to claim 38, wherein said cancel means includes means for responding to an on/-off condition of an electric power source of a camera.

43. A device according to claim 39, further comprising: hindering means for hindering the action of said cancel means.

44. A device according to claim 38, wherein said selecting means includes means for manually operating the selection.

45. A device according to claim 38, wherein said cancel means includes means for responding to the opening the closing of a back lid of a camera.

46. A device according to claim 38, wherein said cancel means includes means for responding to a main switch of a camera.

47. A data recording device for a camera comprising:
(A) memory means for previously storing a plurality of messages;
(B) recording means for recording a message stored in said memory means on recording medium; and
(C) selecting means for selecting a message to be recorded by said recording means from among said plurality of messages,
said recording means including means for forming said message to be recorded in a dot matrix, said recording means further including means responsive to decrease of the format size of said recording medium for decreasing the size of the message to be recorded by removing some of rows or columns of said dot matrix.

48. A device according to claim 47, wherein said selecting means includes means for manually operating the selection.

* * * * *

UNITED STATES PATENT AND TRADEMARK OFFICE
CERTIFICATE OF CORRECTION

PATENT NO. : 5,155,513
DATED : October 13, 1992
INVENTOR(S) : Koichi Matsumura and Yasushi Shiotani It is certified that error appears in the above-indentified patent and that said Letters Patent is hereby corrected as shown below:

```
Col. 1, line 15, Change "the" to -- a --
Col. 1, line 16, Delete "a" first occurrence
Col. 1, line 21, Change "key board" to --keyboard--
Col. 1, line 23, Change "the" to -- of --
Col. 1, line 28, After "film" insert -- have--
Col. 1, line 32, Change "key board" to --keyboard--
Col. 1, line 39, After "above," insert -- a --
Col. 2, line 19, Change "message." to -- message, --
Col. 2, line 24, Change "sufficient, so that the" to -- sufficient. The --
Col. 3, lines 55 and 60. Change "a" to -- an --
Col. 4, line 15, Delete "even"
Col. 4, line 43, After "the" (first occurrence) insert -- respective --
Col. 4, line 46, De lete " respectively"
Col. 6, lines 7 and 8, Change "left hand" to --lefthand --
Col. 6, line 40, Change "numbers" to -- number --
Col. 10, line 35, Change "    ...    " to -- ⌊⌋.7.⌊⌋ ---
Col. 10. line 36, Change "    ...    " to -- ⌊⌋.8.⌊⌋ ---
Col. 10, line 37, Change "THANK⌊⌋YOU⌊⌋" to -- THANK⌊⌋YOU!--
Col. 11, line 19, Change "bitsd" to -- bits --
```

Signed and Sealed this

Seventh Day of December, 1993

BRUCE LEHMAN

*Attest:*

*Attesting Officer*  *Commissioner of Patents and Trademarks*